(12) United States Patent
Aoki et al.

(10) Patent No.: US 11,168,922 B2
(45) Date of Patent: Nov. 9, 2021

(54) HEAT EXCHANGER TUBE, HEAT EXCHANGE UNIT, HEAT EXCHANGE APPARATUS, HOT WATER SUPPLY SYSTEM, AND METHOD OF MANUFACTURING HEAT EXCHANGER TUBE

(71) Applicant: PURPOSE CO., LTD., Fuji (JP)

(72) Inventors: Toshiaki Aoki, Fuji (JP); Tetsuya Oishi, Fuji (JP)

(73) Assignee: PURPOSE CO., LTD., Fuji (JP)

( * ) Notice: Subject to any disclaimer, the term of this patent is extended or adjusted under 35 U.S.C. 154(b) by 313 days.

(21) Appl. No.: 16/009,381

(22) Filed: Jun. 15, 2018

(65) Prior Publication Data

US 2019/0003739 A1    Jan. 3, 2019

(30) Foreign Application Priority Data

Jun. 30, 2017 (JP) .............................. JP2017-128828

(51) Int. Cl.
*F24H 8/00* (2006.01)
*F28D 1/02* (2006.01)
(Continued)

(52) U.S. Cl.
CPC ............... *F24H 8/00* (2013.01); *F24H 1/205* (2013.01); *F28D 1/0213* (2013.01); *F28D 1/0475* (2013.01); *F28D 1/0476* (2013.01); *F28D 7/1638* (2013.01); *F28D 7/1653* (2013.01); *F28D 7/1684* (2013.01);
(Continued)

(58) Field of Classification Search
CPC ....................................................... F24H 8/00
See application file for complete search history.

(56) References Cited

U.S. PATENT DOCUMENTS

2009/0133642 A1* 5/2009 Asakura .................... F24H 8/00
122/32
2010/0229804 A1* 9/2010 Okamoto ................ F24H 1/523
122/18.2
(Continued)

FOREIGN PATENT DOCUMENTS

JP    H04-107213 A    4/1992
JP    07310988 A  *  11/1995
(Continued)

OTHER PUBLICATIONS

KR20030029206A—machine translation (Year: 2003).*
(Continued)

*Primary Examiner* — Nathaniel Herzfeld
(74) *Attorney, Agent, or Firm* — Westerman, Hattori, Daniels & Adrian, LLP

(57) ABSTRACT

A heat exchanger tube for transferring a heat of an exhaust gas to a fluid to be heated includes a turn-back portion formed in an intermediate portion of the heat exchanger tube and a reciprocating conduit portion. The reciprocating conduit portion includes a conduit portion leading from a starting end of the heat exchanger tube to the turn-back portion, and a conduit portion leading from the turn-back portion to a terminal end of the heat exchanger tube. A space equal to or greater than the outer diameter of the conduit portions is provided between these conduit portions.

14 Claims, 32 Drawing Sheets

(51) Int. Cl.
    *F24H 1/20*     (2006.01)
    *F28D 1/047*     (2006.01)
    *F28F 9/02*     (2006.01)
    *F28D 7/16*     (2006.01)
    *F28F 27/00*     (2006.01)
    *F28D 21/00*     (2006.01)

(52) U.S. Cl.
    CPC ..... *F28D 21/0003* (2013.01); *F28D 21/0007* (2013.01); *F28F 9/0209* (2013.01); *F28F 9/0246* (2013.01); *F28F 27/00* (2013.01)

(56) References Cited

U.S. PATENT DOCUMENTS

| | | | | |
|---|---|---|---|---|
| 2013/0264037 A1* | 10/2013 | Otsubo | ............ | F28D 7/087 165/157 |
| 2016/0273850 A1* | 9/2016 | Okamoto | ............ | F28F 21/083 |
| 2016/0377348 A1* | 12/2016 | Fujisawa | ............ | F28F 9/0202 165/175 |
| 2017/0321970 A1* | 11/2017 | Choi | ............ | F28F 9/0131 |

FOREIGN PATENT DOCUMENTS

| | | | |
|---|---|---|---|
| JP | 2004-232922 A | | 8/2004 |
| JP | 2005-274028 A | | 10/2005 |
| JP | 2006-125811 A | | 5/2006 |
| JP | 2007-170733 A | | 7/2007 |
| JP | 2009-180398 A | | 8/2009 |
| JP | 2012137253 A | * | 7/2012 |
| JP | 2013-133956 A | | 7/2013 |
| KR | 20030029206 A | * | 4/2003 |

OTHER PUBLICATIONS

JPH07310988A—machine translation (Year: 1995).*
Office Action dated Dec. 8, 2020, issued in counterpart JP Application No. 2017-128828, with English Translation. (8 pages).
Office Action dated Mar. 2, 2021, issued in countperart JP Application No. 2017-128828, with English translation (8 pages).

* cited by examiner

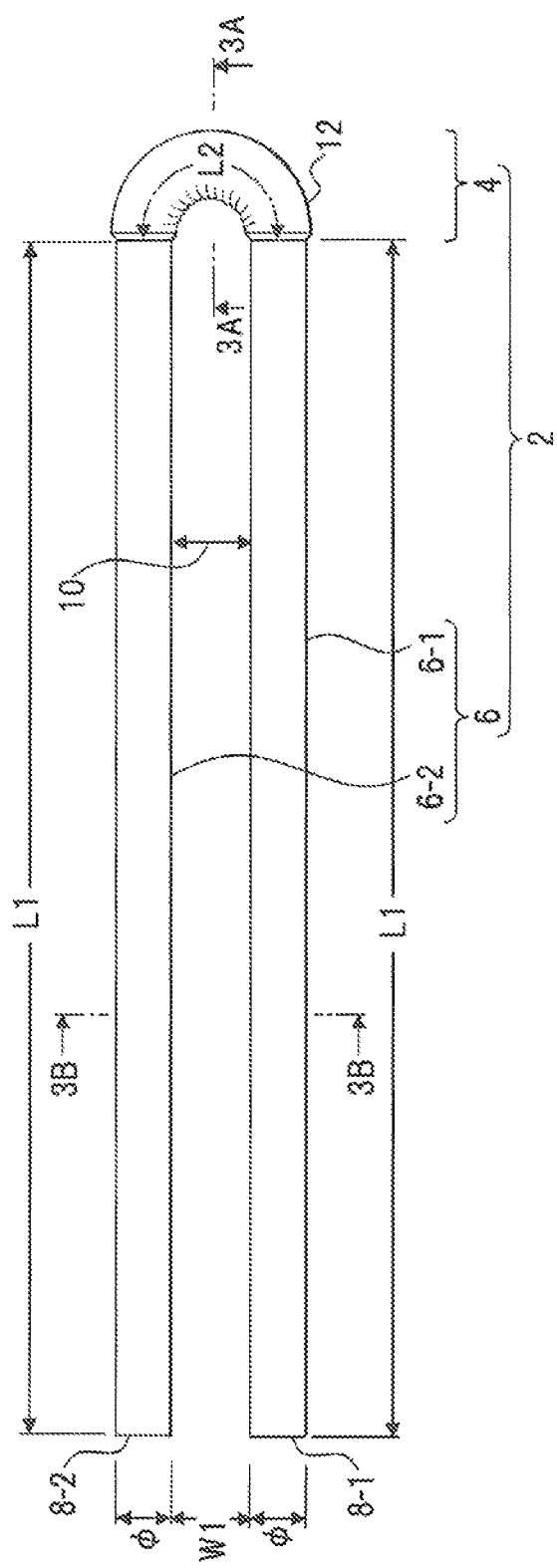

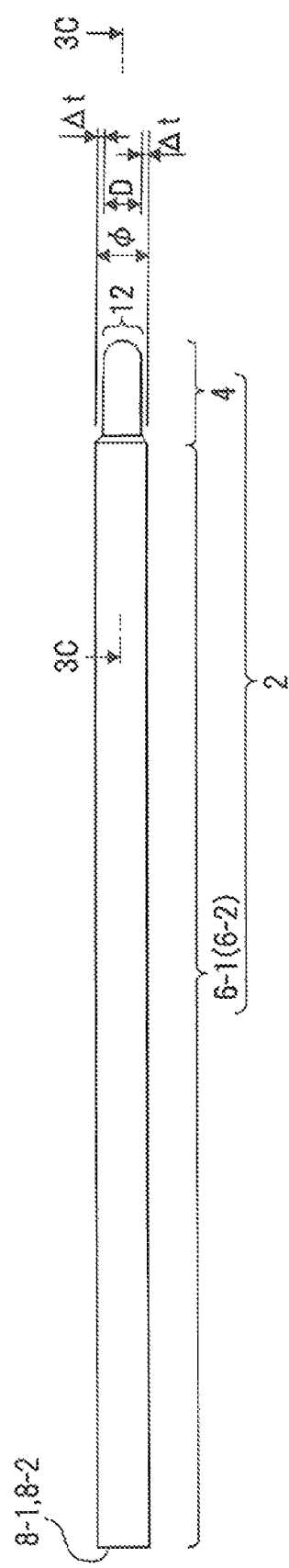

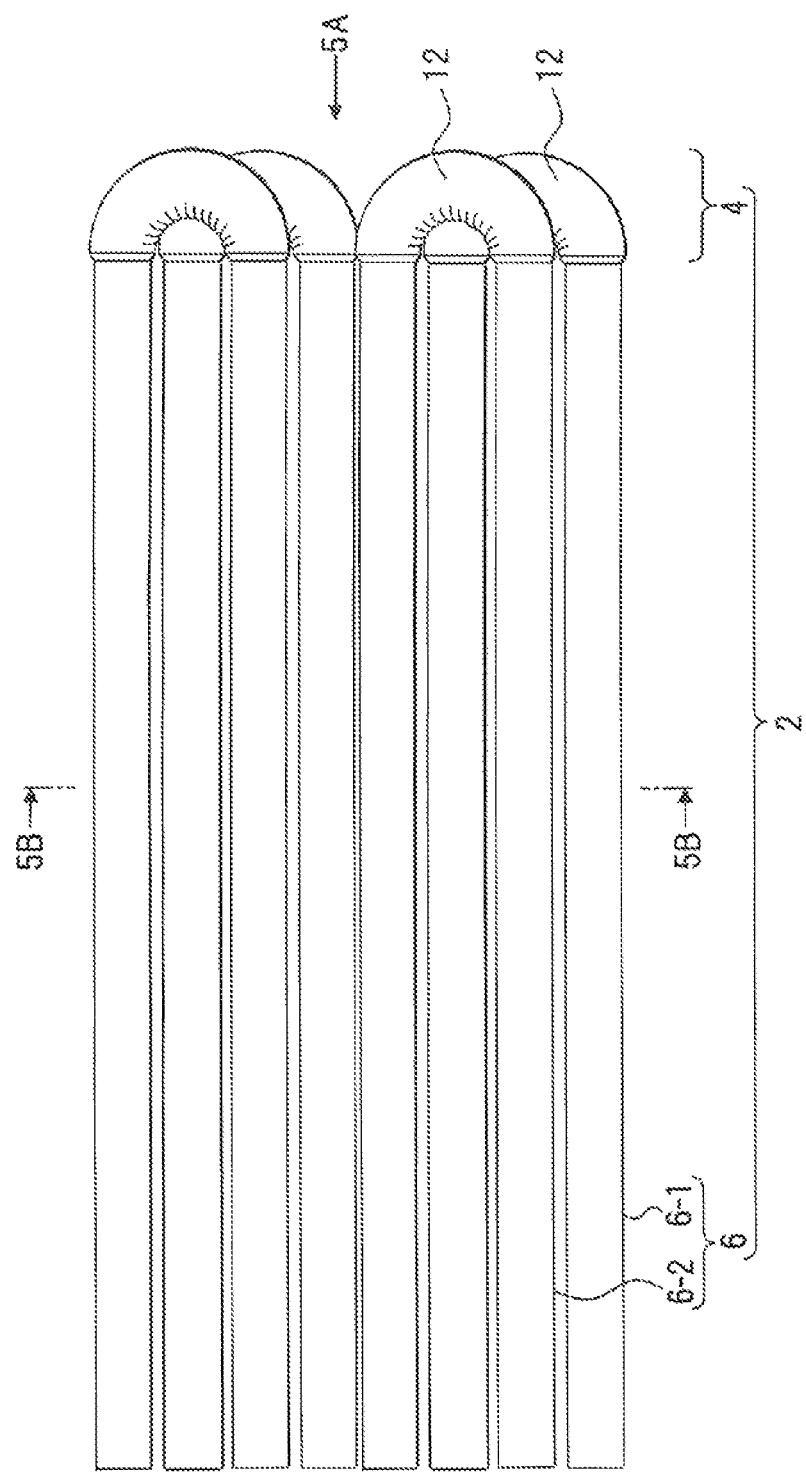

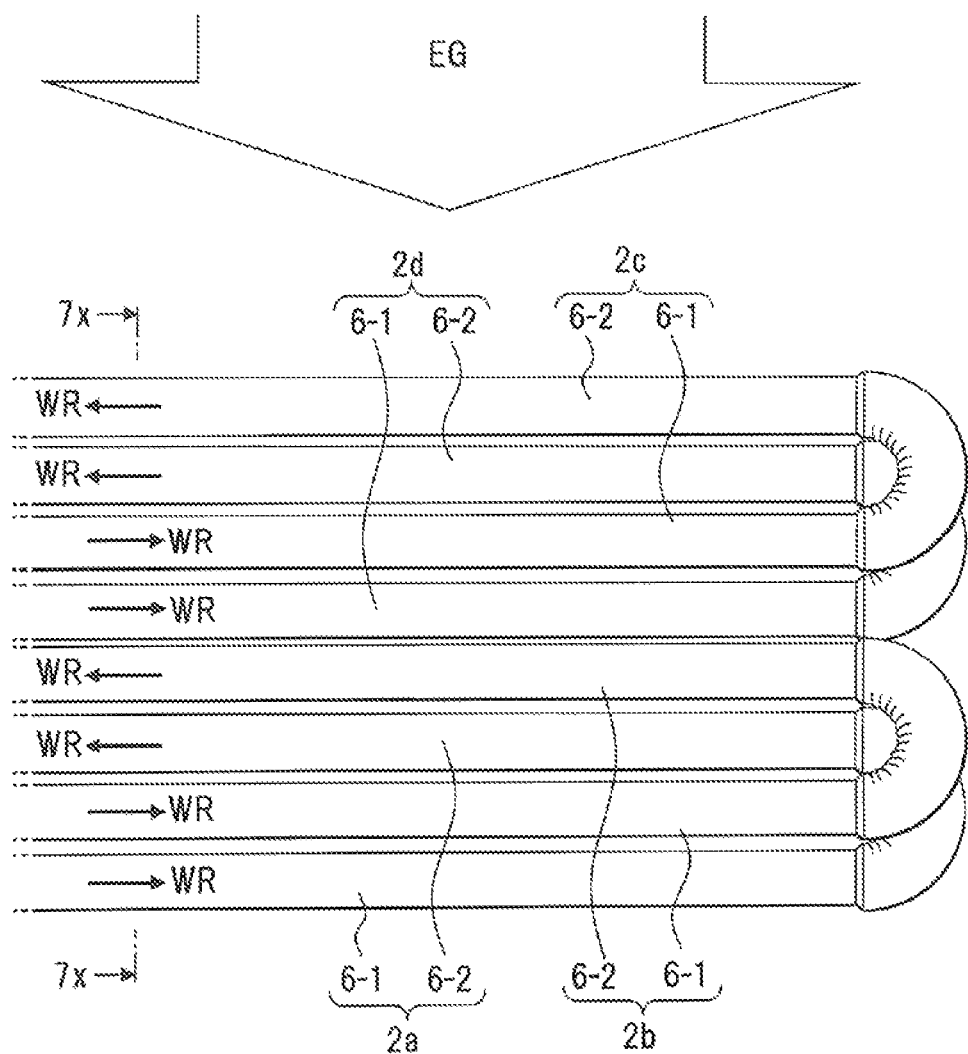

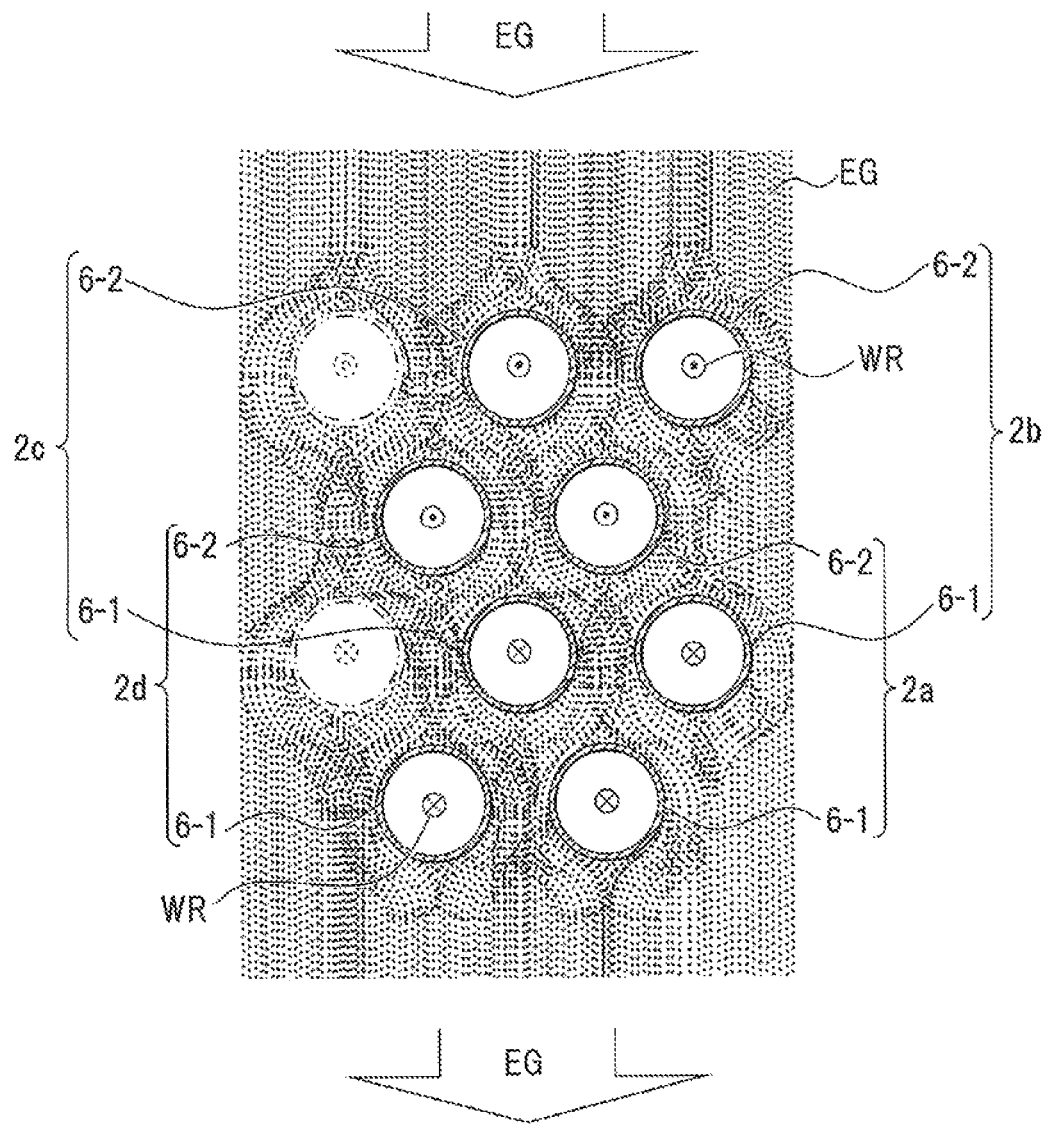

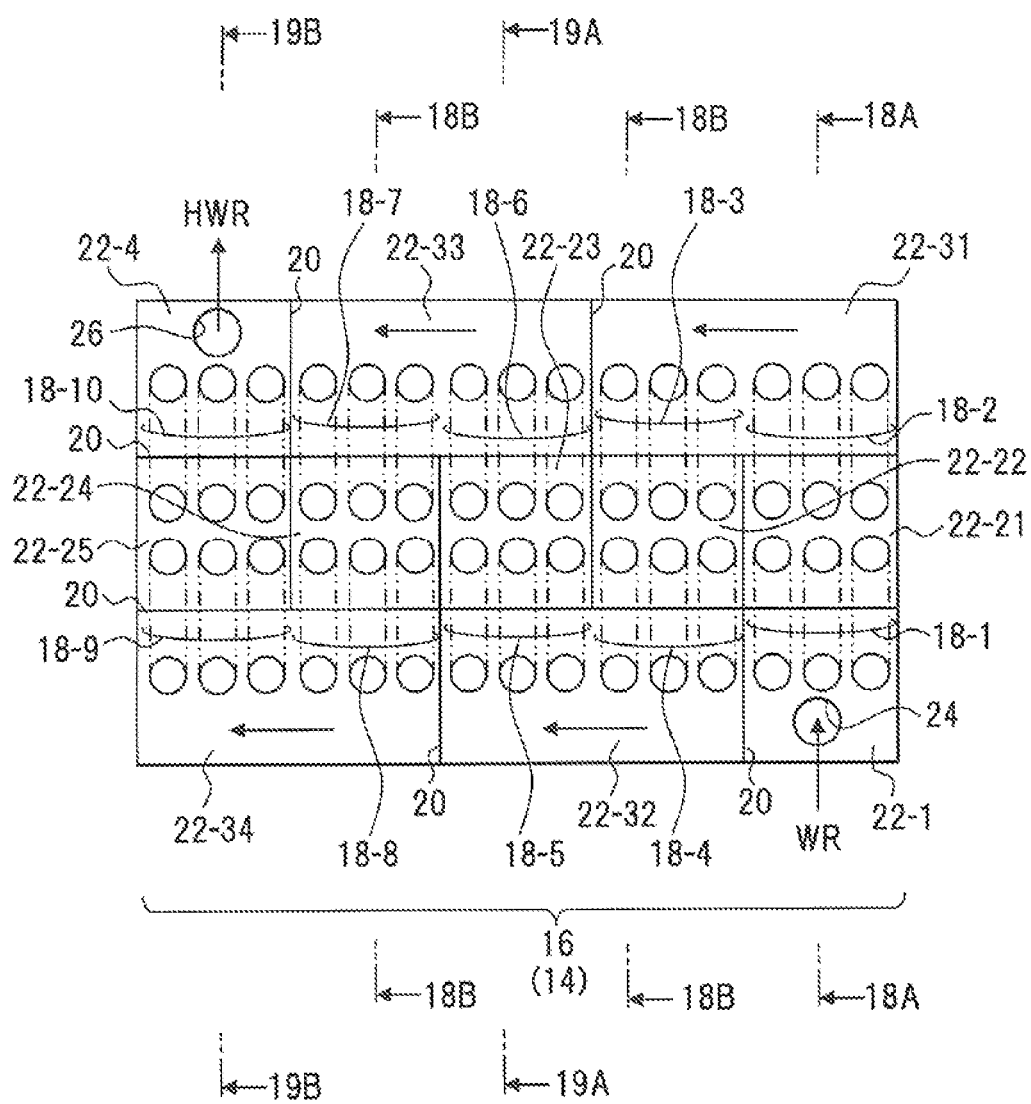

HEAT EXCHANGER TUBE, HEAT EXCHANGE UNIT, HEAT EXCHANGE APPARATUS, HOT WATER SUPPLY SYSTEM, AND METHOD OF MANUFACTURING HEAT EXCHANGER TUBE

CROSS-REFERENCE TO RELATED APPLICATIONS

This application is entitled to the benefit of priority of Japanese Patent Application No. 2017-128828, filed on Jun. 30, 2017, the contents of which are hereby incorporated by reference.

BACKGROUND OF THE INVENTION i) Field of the Invention

The present disclosure relates to a heat exchange technique of transferring heat of an exhaust gas to a fluid to be heated such as feed-water.

ii) Description of the Related Art

A heat exchanger transferring heat of an exhaust gas obtained from combustion of a fuel gas to a fluid to be heated includes a primary heat exchanger and a secondary heat exchanger. The primary heat exchanger mainly transfers the sensible heat of the exhaust gas to the fluid to be heated, and the secondary heat exchanger mainly transfers the latent heat from the exhaust gas after the primary heat exchange to the fluid to be heated.

The primary heat exchanger and the secondary heat exchanger are arranged on the upstream side and the downstream side, respectively, with respect to a flow of the exhaust gas. The fluid to be heated is supplied from the secondary heat exchanger to the primary heat exchanger. With such a configuration, after the latent heat is mainly transferred by the secondary heat exchanger from the exhaust gas to the fluid to be heated having a low temperature before the heat exchange, the sensible heat is mainly transferred by the primary heat exchanger from the exhaust gas to the fluid to be heated, so that the heat exchange efficiency is enhanced.

Regarding such heat exchange by the primary heat exchanger and the secondary heat exchanger, it is known that a heat exchanger tube is disposed in a direction crossing the flow of the exhaust gas (for example, Japanese Unexamined Patent Application Publication No. 2005-274028, and Japanese Unexamined Patent Application Publication No. 2009-180398). Regarding the secondary heat exchanger, it is known that an arc-shaped turn-back portion is included in a heat exchanger tube (for example, Japanese Unexamined Patent Application Publication No. 2013-133956). In this secondary heat exchanger, it is known that a turn-back portion is flattened to overlap a secondary heat exchanger tube (for example, Japanese Unexamined Patent Application Publication No. 2004-232922).

BRIEF SUMMARY OF THE INVENTION

A heat exchanger transferring heat of an exhaust gas to a fluid to be heated such as water has a problem that the heat exchange efficiency is reduced if the exhaust gas flows without entwining the exhaust gas with heat exchanger tubes. In contrast, if heat exchanger tubes are densely arranged at an excessive density of the heat exchanger tubes so as to expand an area of contact between the exhaust gas and the heat exchanger tubes through which the fluid to be heated flows, the passage of the exhaust gas is hindered, causing a problem of reduced exchange efficiency.

Therefore, an object of the present disclosure is to enhance the heat exchange efficiency by increasing a degree of contact between the exhaust gas and the heat exchanger tube, for example.

Another object of the present disclosure is to make the heat exchange unit compact and improve the heat exchange efficiency by increasing the density of the heat exchanger tubes, for example.

Another object of the present disclosure is to provide a heat exchange system in which the degree of contact between the exhaust gas and the heat exchanger tubes is increased.

According to an aspect of a heat exchanger tube of the present disclosure, the heat exchanger tube for transferring a heat of an exhaust gas to a fluid to be heated includes a turn-back portion formed in an intermediate portion of the heat exchanger tube, and a reciprocating conduit portion. The reciprocating conduit portion includes a conduit portion leading from a starting end of the heat exchanger tube to the turn-back portion, and a conduit portion leading from the turn-back portion to a terminal end of the heat exchanger tube. A space equal to or greater than the outer diameter of the conduit portions is provided between these conduit portions.

According to an aspect of a heat exchange unit of the present disclosure, the heat exchange unit for transferring heat of an exhaust gas to a fluid to be heated includes a heat exchanger tube part including one or more heat exchanger tubes allowing the fluid to be heated to flow through the one or more heat exchanger tubes, and a header part including a plurality of chambers coupled by the heat exchanger tube part, the chambers forming a flow passage of the fluid to be heated through the heat exchanger tube part.

According to an aspect of a heat exchange apparatus of the present disclosure, the heat exchange apparatus includes a combustion housing causing an exhaust gas to flow, and a heat exchange unit disposed in the combustion housing. The heat exchange unit includes a heat exchanger tube part including one or more heat exchanger tubes allowing a fluid to be heated to flow through the one or more heat exchanger tubes, and a header part including a plurality of chambers coupled by the heat exchanger tube part, the chambers forming a flow passage of the fluid to be heated through the heat exchanger tube part.

According to an aspect of a hot water supply system of the present disclosure, the hot water supply system includes a burner combusting a fuel gas, a combustion housing causing an exhaust gas by the burner to flow, and a heat exchange unit disposed in the combustion housing. The heat exchange unit includes a heat exchanger tube part including one or more heat exchanger tubes allowing a fluid to be heated to flow through the one or more heat exchanger tubes, and a header part including a plurality of chambers coupled by the heat exchanger tube part, the chambers forming a flow passage of the fluid to be heated through the heat exchanger tube part.

According to an aspect of a method of manufacturing a heat exchanger tube of the present disclosure, the method of manufacturing a heat exchanger tube transferring a heat of an exhaust gas to a fluid to be heated includes forming a turn-back portion at an intermediate portion of a tube, forming a reciprocating conduit portion including a conduit portion leading from a starting end of the tube to the turn-back portion and a conduit portion leading from the turn-back portion to a terminal end of the tube, a space between these conduit portions having a size exceeding the outer diameter of the tube, and forming in the turn-back portion a flattened portion that is a conduit flattened in a direction orthogonal to a curved surface of the turn-back portion.

BRIEF DESCRIPTION OF THE SEVERAL VIEWS OF THE DRAWING

FIG. 1 is a plane view of a heat exchanger tube according to a first embodiment.

FIG. 2 is a side view of the heat exchanger tube.

FIG. 4 is a view of an arrangement form of heat exchanger tubes.

FIG. 6 is a view of a relationship between the arrangement form of the heat exchanger tubes and exhaust gas.

FIG. 7 is a view of a flow of exhaust gas to the heat exchanger tubes disposed in parallel.

FIG. 17 is a view of a heat exchange unit according to a third embodiment.

FIG. 31B is a view of a forming step of a curved portion.

DETAILED DESCRIPTION OF THE INVENTION

First Embodiment

[Heat Exchanger Tube]

Figure 3A:
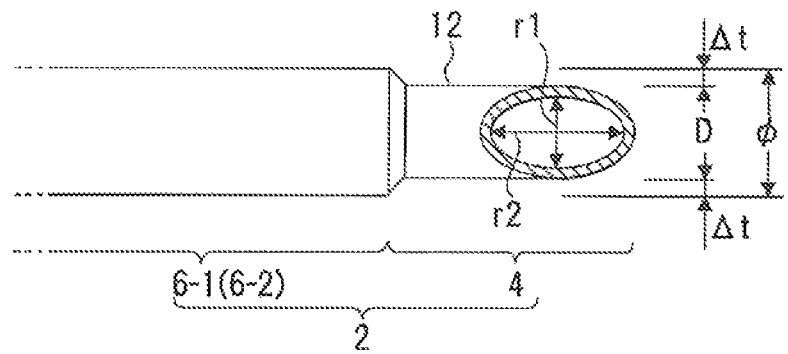
FIG. 3A is a cross-sectional view taken along a line 3A-3A of FIG. 1.

FIG. 1 shows a heat exchanger tube according to a first embodiment. A configuration shown in FIG. 1 is an example, and the present invention is not limited to such a configuration.

The heat exchanger tube 2 is a conduit for circulating, for example, water WR as a fluid to be heated and transferring heat of an exhaust gas. The heat exchanger tube 2 is made up of a seamless tube made of a corrosion-resistant metal such as stainless steel, for example.

The heat exchanger tube 2 includes a turn-back portion 4 and a reciprocating conduit portion 6. The turn-back portion 4 is formed in an intermediate portion of the heat exchanger tube 2, and is, for example, a semicircular bent portion.

The reciprocating conduit portion 6 is a pair of conduit portions 6-1, 6-2. The one conduit portion 6-1 is a conduit leading from a starting end portion 8-1 of the heat exchanger tube 2 to the turn-back portion 4, and the other conduit portion 6-2 is a conduit leading from the turn-back portion 4 to a terminal end portion 8-2 of the heat exchanger tube 2. For example, a straight tube is used for the conduit portions 6-1, 6-2; however, a bent tube, a corrugated tube, etc. may also be used.

The conduit portions 6-1, 6-2 are arranged in parallel, and a space 10 is set between the conduit portions 6-1, 6-2. When $\varphi$ is the outer diameter (diameter) of the conduit portions 6-1, 6-2, a width W1 of the space 10 is smaller than twice the diameter $\varphi$ and larger than the diameter $\varphi$ and has the following relationship.

$$\varphi \times 2 > W1 > \varphi \quad (1)$$

When W2 is a center-to-center distance between the conduit portions 6-1, 6-2, the center-to-center distance W2 is expressed by the width W1 of the space 10 and the diameter $\varphi$ as follows.

$$W2 = W1 + \varphi \quad (2)$$

When L1 is the length of each of the conduit portions 6-1, 6-2 and L2 is the center length of the turn-back portion 4, an approximate flow passage length Lm of the heat exchanger tube 2 can be expressed as follows.

$$Lm = L1 \times 2 + L2 \qquad (3)$$
$$\approx L1 \times 2 + W2 \times \pi/2$$

FIG. 2 shows a side surface of the heat exchanger tube 2. The turn-back portion 4 includes a flattened portion 12. This flattened portion 12 is a conduit compressed and flattened in a direction orthogonal to a curved surface of the turn-back portion 4. When Δt is a compression width and D is the thickness of the flattened portion 12, the thickness D can be expressed as follows.

$$D = \varphi - \Delta t \times 2 < \varphi \qquad (4)$$

From Eq. (4), the compression width Δt is expressed as follows.

$$\Delta t = (\varphi - D)/2 \qquad (5)$$

[Turn-Back Portion, Flattened Portion, and Arrangement of Heat Exchanger Tube]

Figure 3B:
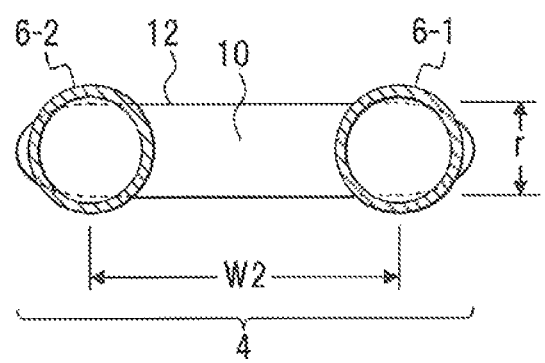
FIG. 3B is a cross-sectional view taken along a line 3B-3B of FIG. 1.
Figure 3C:
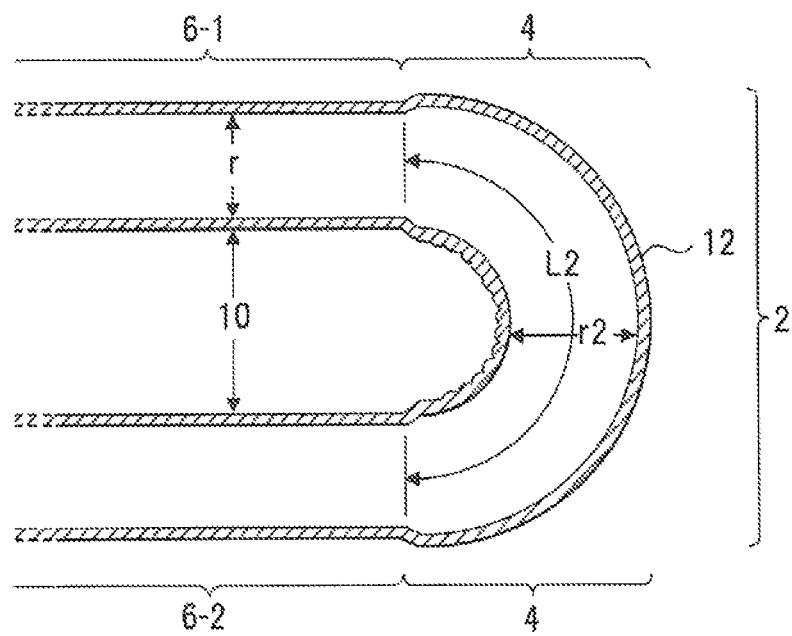
FIG. 3C is a cross-sectional view taken along a line 3C-3C of FIG. 2.

FIG. 3A shows a cross section taken along a line 3A-3A of FIG. 1, FIG. 3B shows a cross section taken along a line 3B-3B of FIG. 1, and FIG. 3C shows a cross section taken along a line 3C-3C of FIG. 2. The turn-back portion 4 has a conduit cross section protruding in the direction of the curved surface. Thus, while the conduit portions 6-1, 6-2 have a circular cross section, the conduit cross section in the turn-back portion 4 is formed into an elliptical cross section having a major axis in the curved surface direction due to flattening. The conduit cross-sectional area of the turn-back portion 4 is the same cross-sectional area as the circular cross section of the conduit portions 6-1, 6-2.

When r is the inner diameter of the conduit portions 6-1, 6-2, r1 is the minor axis of the inside of the turn-back portion 4, and r2 is the major axis of the turn-back portion 4, r1 and r2 are expressed as follows.

$$r1 \approx r - \Delta t \times 2 \qquad (6)$$
$$r2 \approx r + \Delta t \times 2 \qquad (7)$$

According to the heat exchanger tube 2, as shown in FIG. 4, a plurality of the heat exchanger tubes 2 can be arranged such that the turn-back portions 4 of the plurality of the heat exchanger tubes 2 are overlapped with each other at the flattened portions 12.

Figure 5A:
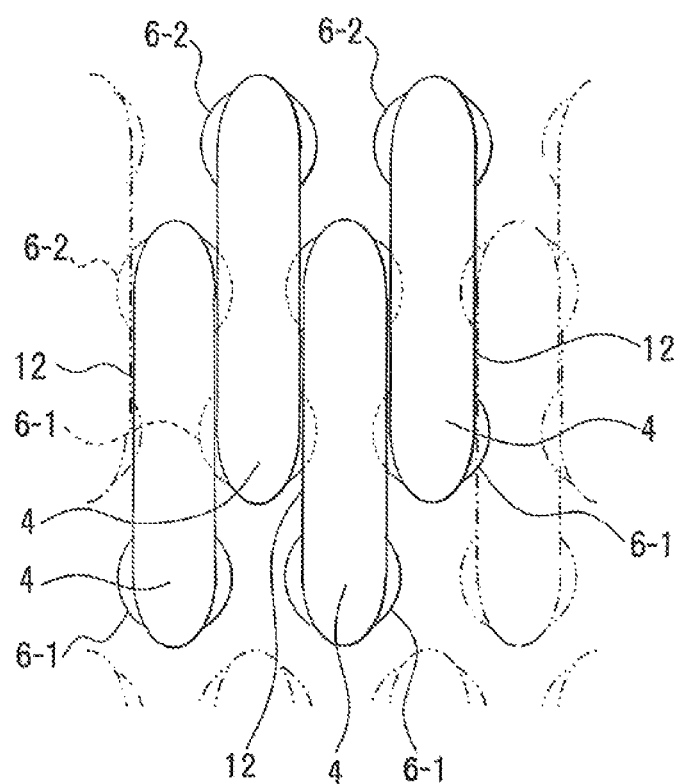
FIG. 5A is a view in a direction 5A of FIG. 4.

FIG. 5A shows the heat exchanger tubes 2 in a direction 5A of FIG. 4. The adjacent conduit portion 6-1 or 6-2 can be arranged to come into the space 10 between the conduit portions 6-1, 6-2.

Figure 5B:
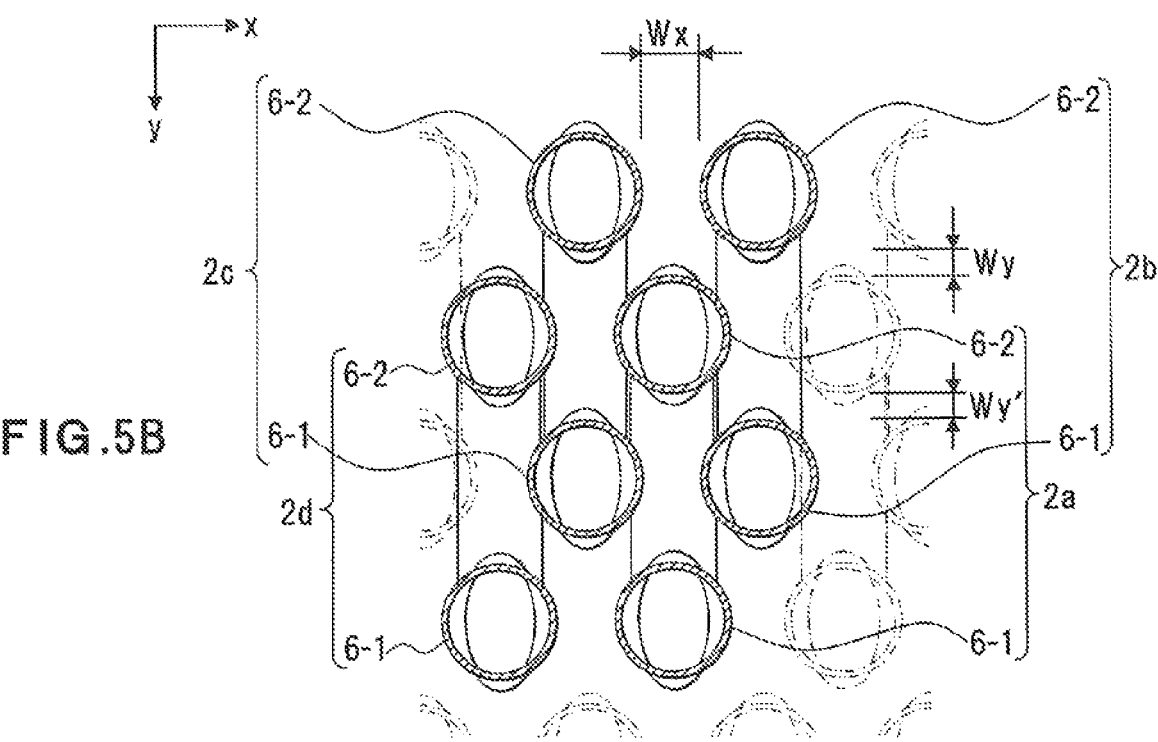
FIG. 5B is a cross-sectional view taken along a line 5B-5B of FIG. 4.

FIG. 5B shows a cross section taken along a line 5B-5B of FIG. 4. In FIG. 5B, an X axis is defined in a direction orthogonal to the curved surface of the turn-back portion 4 of the heat exchanger tube 2, while the Y axis is defined in the same direction as the curved surface, and the multiple adjacent heat exchanger tubes 2 are denoted by different reference numerals so that the heat exchanger tubes 2 are referred to as heat exchanger tubes 2a, 2b, 2c, 2d.

The adjacent heat exchanger tubes 2a, 2b, 2c, 2d are arranged by overlapping the flattened portions 12. When Wx is a gap between the conduit portions 6-2, 6-2 of the heat exchanger tubes 2b, 2c in the X-axis direction, Wy is a gap between the conduit portion 6-2 of each heat exchanger tube 2a, 2d and the conduit portion 6-2 of each heat exchanger tube 2b, 2c in the Y-axis direction, and Wy' is a gap between the conduit portion 6-2 of each heat exchanger tube 2a, 2d and the conduit portion 6-1 of each heat exchanger tube 2b, 2c in the Y-axis direction, the gaps Wx, Wy, Wy' are expressed as follows.

$$Wx > Wy \qquad (8)$$
$$Wx > Wy' \qquad (9)$$

The gaps Wx, Wy, Wy' are all smaller than φ and are expressed as follows.

$$Wx \approx \varphi - 2\Delta t < \varphi \qquad (10)$$
$$Wy \approx (W1 - \varphi)/2 < \varphi/2 \qquad (11)$$
$$Wy' \approx (W1 - \varphi)/2 < \varphi/2 \qquad (12)$$
$$Wy < Wy' \qquad (13)$$

Wy may be equal to Wy'. Wy' may be set larger than Wy since a partition for grouping the heat exchanger tubes 2 described later is disposed on the gap Wy' side.

[Heat Exchange Function]

As shown in FIG. 6, by causing an exhaust gas EG to flow in a direction crossing the conduit portions 6-1, 6-2 while water WR is allowed to flow through the multiple heat exchanger tubes 2 arranged in this way, the heat of the exhaust gas EG can be transferred to the water WR to heat the water WR to make hot water HWR.

FIG. 7 shows a cross section taken along a line 7x-7x of FIG. 6. The Exhaust gas EG can be entwined with tube surface portions of the conduit portions 6-1, 6-2.

The exhaust gas EG may be allowed to flow in a direction opposite to the direction of flow of the exhaust gas EG shown in FIG. 6. That is to say, the exhaust gas EG may be allowed to flow first on the conduit portion 6-1 side.

[Effects of the First Embodiment]

According to the first embodiment, the following effects can be obtained.

(1) By bringing the flattened portions 12 into close contact with each other as shown in FIG. 4, each of the conduit portions 6-1, 6-2 of the adjacent heat exchanger tubes 2 can be arranged to come into the space 10 of the reciprocating conduit portion 6 of the other heat exchanger tube 2, so that the conduit portions 6-1, 6-2 of the heat exchanger tubes 2 can be densified.

(2) A heat exchange unit including the multiple heat exchanger tubes 2 can be made compact.

(3) The exhaust gas EG can be entwined with the conduit portions 6-1, 6-2 of the heat exchanger tubes 2, and the heat of the exhaust gas EG can efficiently be transferred to the fluid to be heated such as the water WR, so that the heat exchange efficiency of the exhaust gas EG can be enhanced.

Second Embodiment

[Heat Exchange Unit and Heat Exchange Operation]

Figure 8:
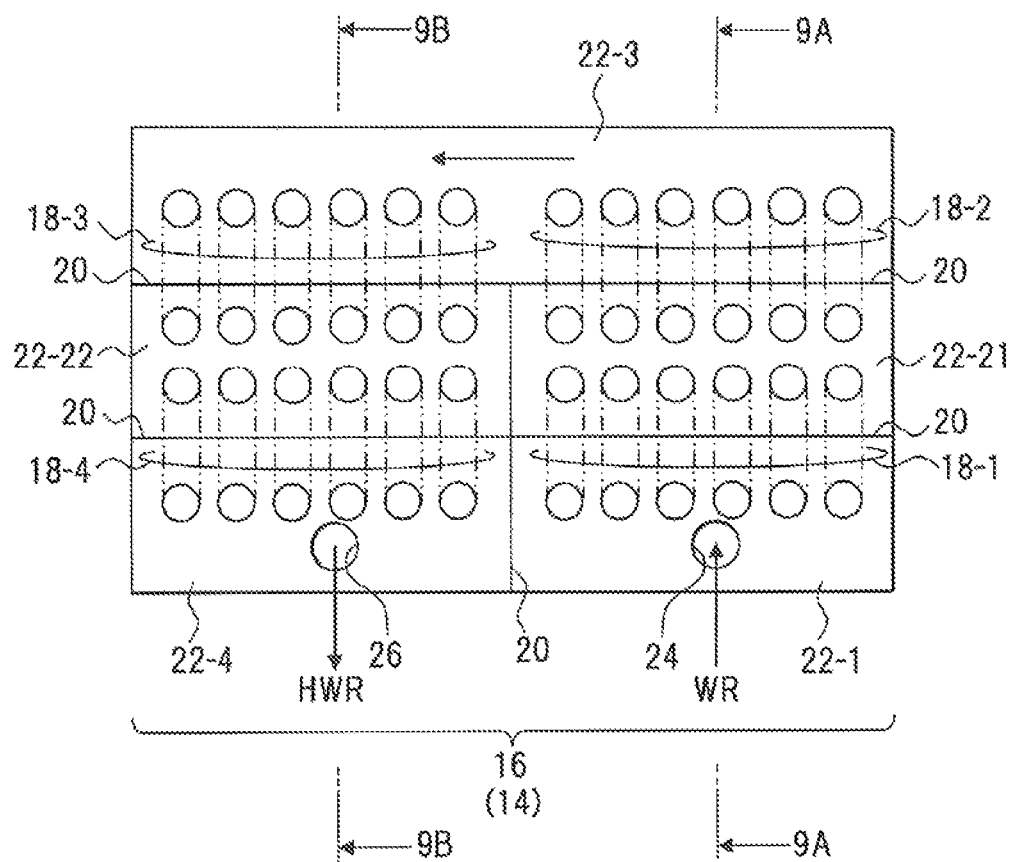
FIG. 8 is a view of a heat exchange unit according to a second embodiment.
Figure 9A:
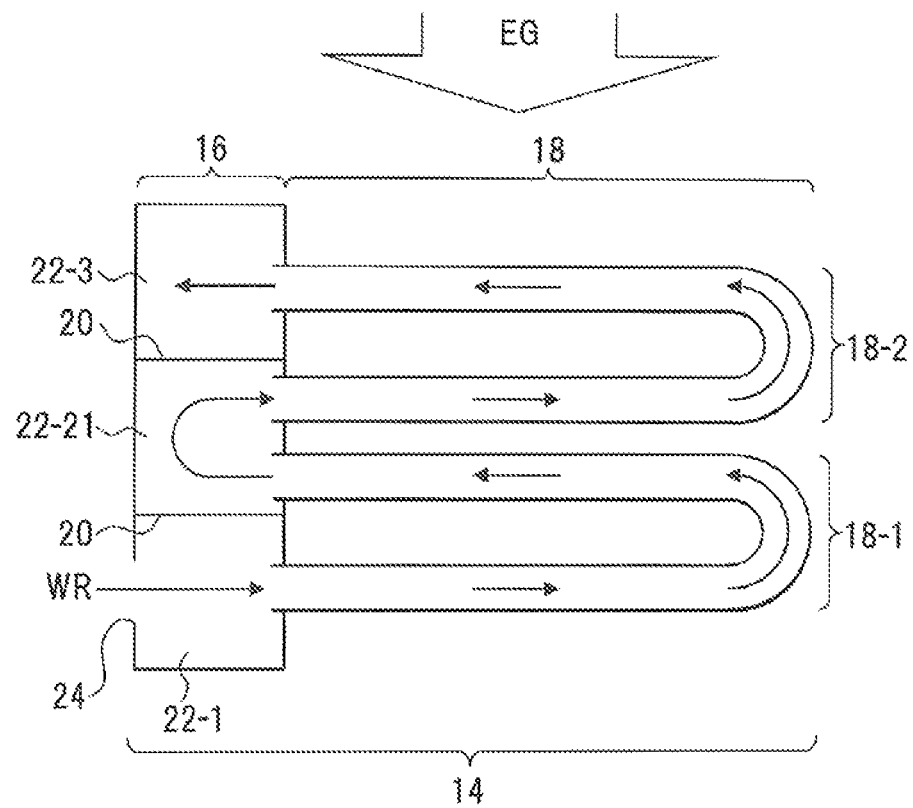
FIG. 9A is a cross-sectional view taken along a line 9A-9A of FIG. 8.
Figure 9B:
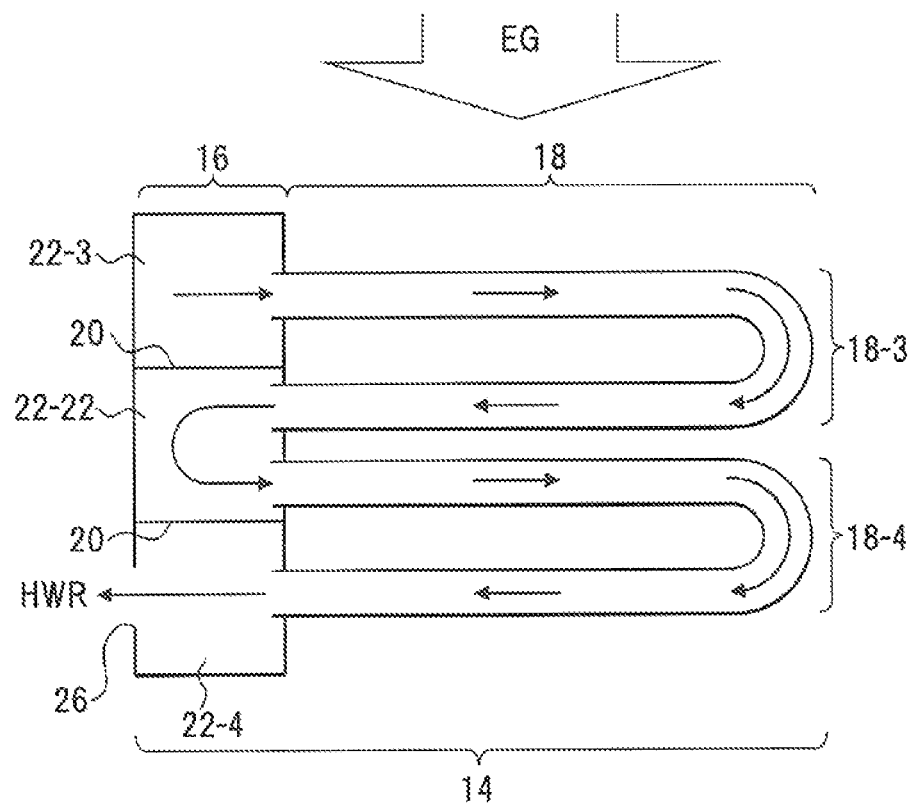
FIG. 9B is a cross-sectional view taken along a line 9B-9B of FIG. 8.

FIG. 8 shows an outline of the heat exchange unit according to a second embodiment. FIG. 9A shows a cross sectional taken along a line 9A-9A of FIG. 8. FIG. 9B shows a cross section taken along a line 9B-9B of FIG. 8. Configurations shown in FIGS. 8, 9A, and 9B are examples, and the present invention is not limited to such configurations.

A heat exchange unit 14 includes a header part 16 and a heat exchanger tube part 18. The heat exchanger tube part 18 includes a first heat exchanger tube group 18-1, a second heat exchanger tube group 18-2, a third heat exchanger tube group 18-3, and a fourth heat exchanger tube group 18-4.

The header part 16 is partitioned into multiple chambers by multiple partition walls 20 disposed in a lattice pattern in the vertical and horizontal directions. The chambers include an entry-side chamber 22-1 that is an example of a first chamber, pass-through chambers 22-21, 22-22 that are an example of a second chamber, a turn-back chamber 22-3 that is an example of a third chamber, and an exit-side chamber 22-4 that is an example of a fourth chamber. The water WR is introduced into the entry-side chamber 22-1. The pass-through chambers 22-21, 22-22 allows passage of the water WR in the flow direction. The turn-back chamber 22-3 turns back the flow of the water WR from the pass-through chamber 22-21 to the pass-through chamber 22-22. The exit-side chamber 22-4 guides the water WR from the pass-through chamber 22-22 to the outside.

The entry-side chamber 22-1 includes an entry-side port 24, and the exit-side chamber 22-4 includes an exit-side port 26. The first heat exchanger tube group 18-1 is connected to the entry-side chamber 22-1 and the pass-through chamber 22-21, and the second heat exchanger tube group 18-2 is connected to the pass-through chamber 22-21 and the turn-back chamber 22-3. Similarly, the third heat exchanger tube group 18-3 is connected to the turn-back chamber 22-3 and the pass-through chamber 22-22, and the fourth heat exchanger tube group 18-4 is connected to the pass-through chamber 22-22 and the exit-side chamber 22-4.

As a result, the water WR introduced from the entry-side port 24 into the entry-side chamber 22-1 is guided as indicated by arrows of FIG. 9A from the entry-side chamber 22-1 through the heat exchanger tube group 18-1 and the pass-through chamber 22-21 to the turn-back chamber 22-3.

The water WR reaching the turn-back chamber 22-3 is guided as indicated by arrows of FIG. 9B through the heat exchanger tube group 18-3 and the pass-through chamber 22-2 to the exit-side chamber 22-4 and reaches the exit-side port 26. The water WR flows through the header part 16 and the heat exchanger tube groups 18-1, 18-2, 18-3, 18-4 for heat exchange with the heat of the exhaust gas EG This heat exchange turns the water WR to hot water, and the hot water HWR is led out from the exit-side port 26.

[Heat Exchange Unit 14 According to the Second Embodiment]

Figure 10:
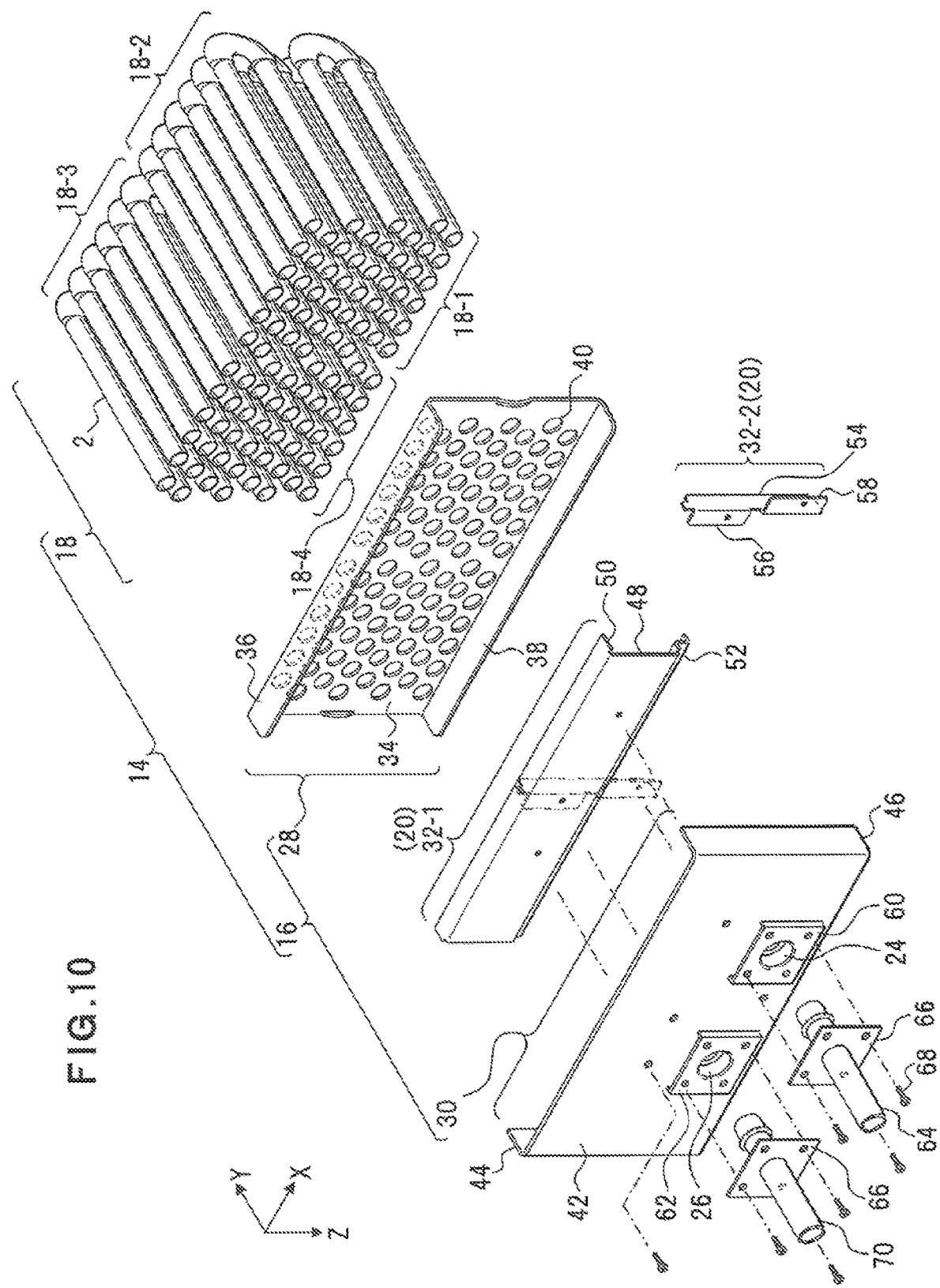
FIG. 10 is an exploded perspective view of a header part.

FIG. 10 shows the heat exchange unit 14 disassembled into components. The configuration shown in FIG. 10 is an example, and the present invention is not limited to such a configuration.

The heat exchanger tube groups 18-1, 18-2, 18-3, 18-4 of the heat exchanger tube part 18 each include the 12 heat exchanger tubes 2 (FIG. 1), so that the heat exchanger tube part 18 includes a total of the 48 heat exchanger tubes 2. Any number of the heat exchanger tubes 2 may be disposed, and the present invention is not limited to these numerical values.

[Header Part 16 According to the Second Embodiment]

The header part 16 includes a heat exchanger tube mounting panel 28, a back panel 30, and partition members 32-1, 32-2.

The heat exchanger tube mounting panel 28 is a panel member having a C-shaped cross section and enclosing a front surface and upper and lower surfaces of the header part 16. The heat exchanger tube mounting panel 28 includes a flat fixing panel portion 34 and includes a top panel portion 36 on the upper edge side of the fixing panel portion 34 and a bottom panel portion 38 on the lower edge side of the fixing panel portion 34. The fixing panel portion 34 includes multiple mounting holes 40 necessary for mounting the heat exchanger tubes 2 of the heat exchanger tube groups 18-1, 18-2, 18-3, 18-4.

The back panel 30 is a panel member having a C-shaped cross section and enclosing a back surface and left and right side surfaces of the header part 16. The back panel 30 includes a port fixing panel portion 42. Facing the heat exchanger tube mounting panel 28, the back panel 30 includes a side panel portion 44 on the left edge side of the port fixing panel portion 42. Facing the heat exchanger tube mounting panel 28, the back panel 30 includes a side panel portion 46 on the right edge side of the port fixing panel portion 42.

The partition member 32-1 includes a fixed portion 48 fixed to the port fixing panel portion 42 of the back panel 30 and includes a top-side partition wall 50 on the upper edge side of the fixed portion 48 and a bottom-side partition wall 52 on the lower edge side of the fixed portion 48. Unlike the top-side partition wall 50, the bottom-side partition wall 52 has a bent cross-sectional shape.

The partition member 32-2 includes a left-right partition wall 54 and fixed portions 56, 58. The left-right partition wall 54 is disposed in a central portion of the partition member 32-1 to divide a space inside the partition member 32-1 into left and right. The fixed portion 56 is fixed to the partition member 32-1 by a fixing screw, for example, and the fixed portion 58 is fixed to the port fixing panel portion 42 of the back panel 30 by a fixing screw, for example.

The entry-side port 24 opening the entry-side chamber 22-1 and the exit-side port 26 opening the exit-side chamber 22-4 are formed in the port fixing panel portion 42 of the back panel 30. A tube fixing portion 60 is disposed around the entry-side port 24 and a tube fixing portion 62 is disposed around the exit-side port 26. A water supply tube 64 is inserted into the entry-side port 24, and a flange portion 66 provided for the water supply tube 64 is fixed to the tube fixing portion 60 by fixing screws 68. A water discharge tube 70 is inserted into the exit-side port 26, and a flange portion 66 provided for the water discharge tube 70 is fixed to the tube fixing portion 62 by fixing screws 68.

Figure 11A:
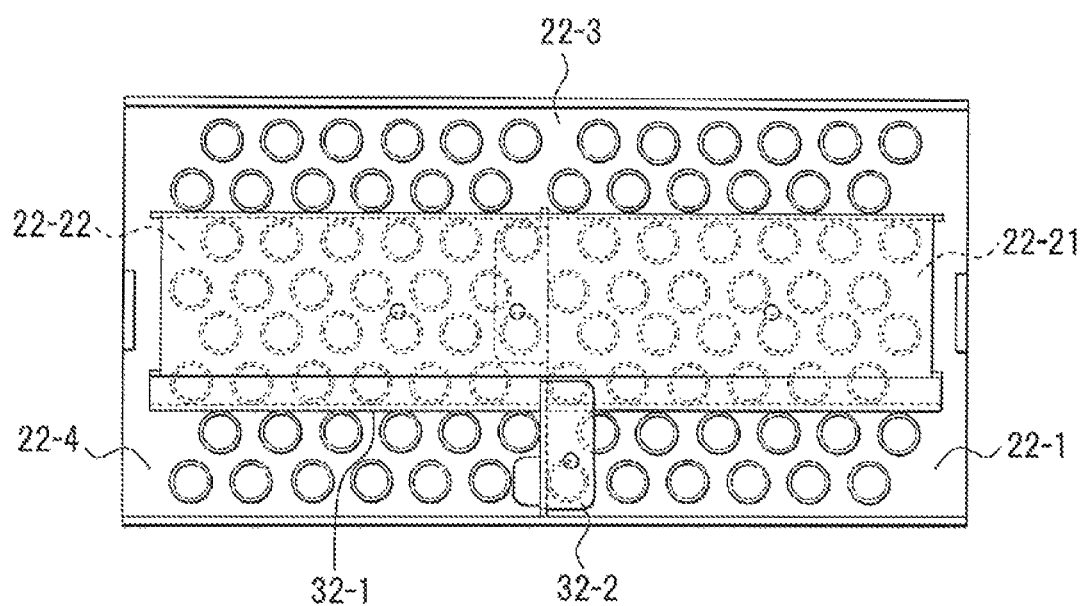
FIG. 11A is a view of arrangement of partition members in the header part.

FIG. 11A shows the inside of the header part 16 with the back panel 30 removed. A space portion is formed in the header part 16 by the heat exchanger tube mounting panel 28 and the back panel 30, and the space portion is sectioned by the partition members 32-1, 32-2 into the entry-side chamber 22-1, the pass-through chambers 22-21, 22-22, the turn-back chamber 22-3, and the exit-side chamber 22-4.

Figure 11B:
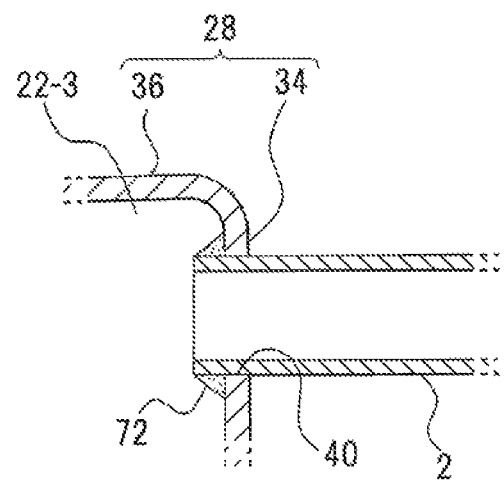
FIG. 11B is a cross-sectional view of fixing of a heat exchanger tube fixing panel and the heat exchanger tubes.

FIG. 11B shows a cross section where the fixing panel portion 34 of the heat exchanger tube mounting panel 28 is fixed to the heat exchanger tube 2. The heat exchanger tube 2 is inserted into each of the mounting holes 40 of the fixed panel portion 34, and an end portion of the heat exchanger tube 2 is slightly projected and maintained. An edge portion of the heat exchanger tube 2 and the fixing panel portion 34 are fixed to each other by welding 72.

Figure 12:
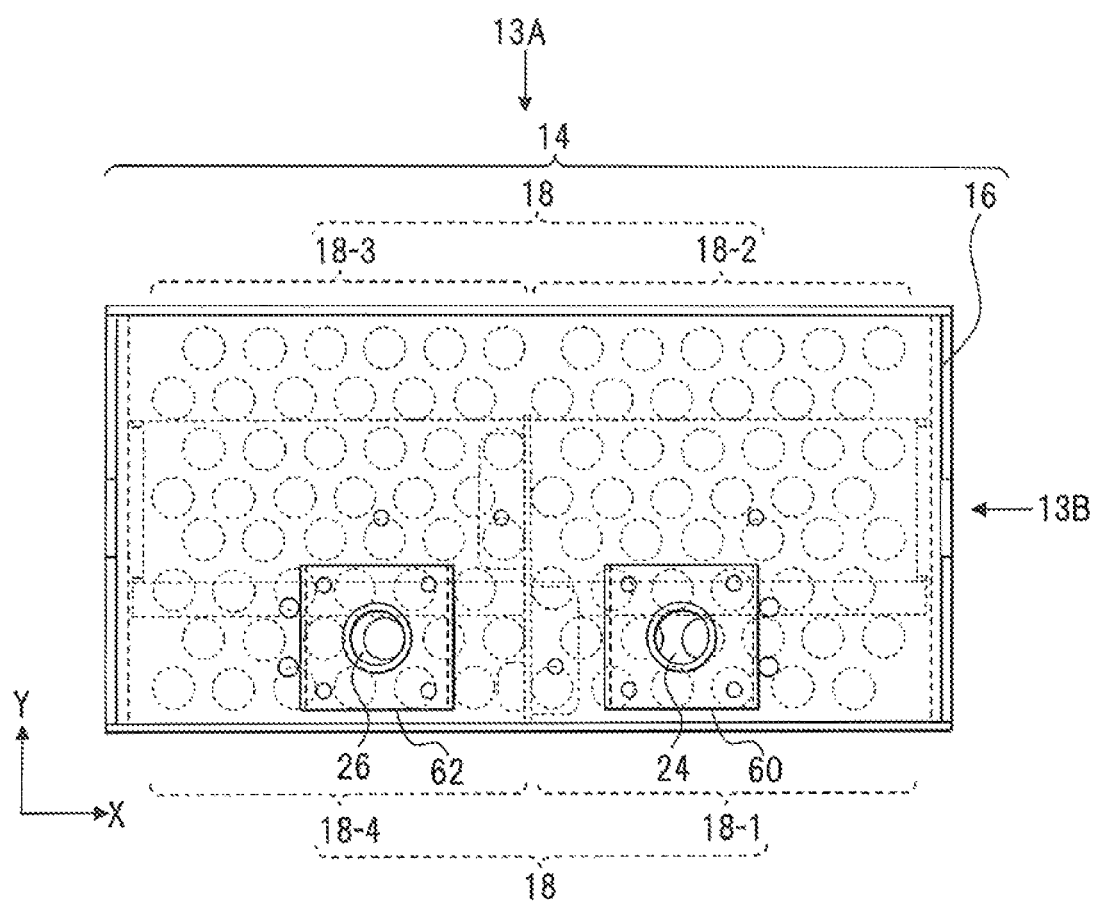
FIG. 12 is a front view of the header part.
Figure 13A:
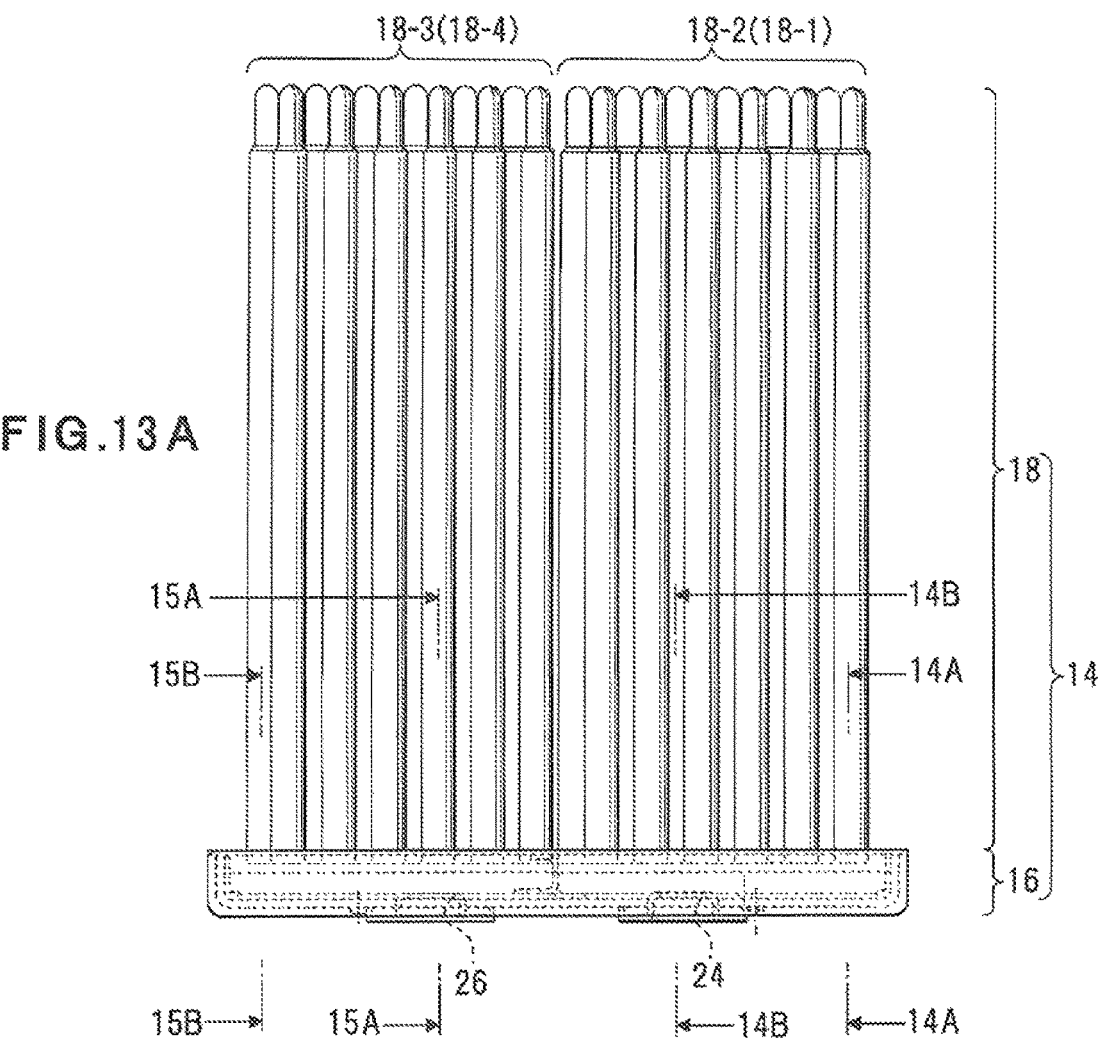
FIG. 13A is a plane view of the header part.
Figure 13B:
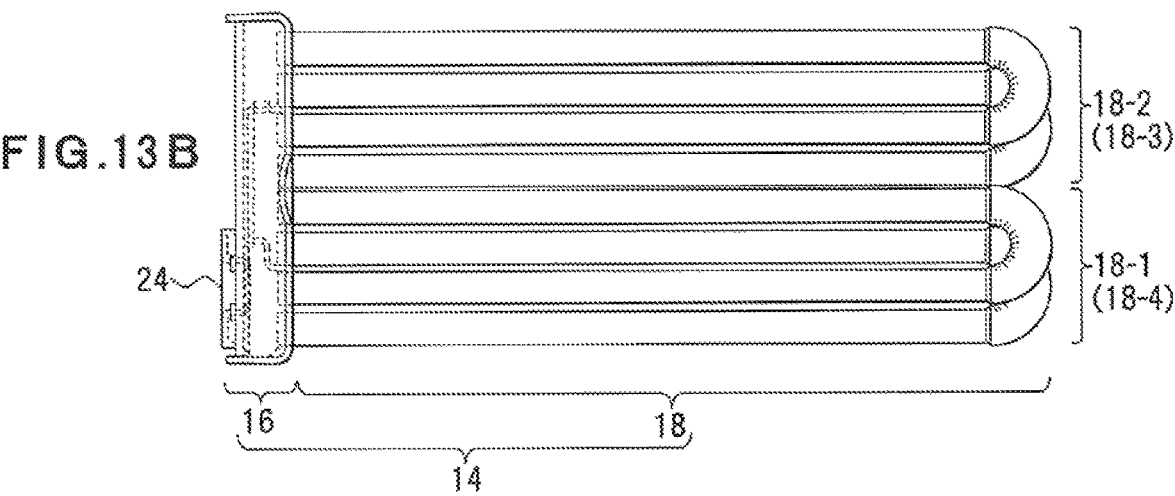
FIG. 13B is a side view of the header part.

The heat exchange unit 14 is assembled as shown in FIGS. 12, 13A and 13B from the components shown in FIG. 10. FIG. 12 shows the heat exchange unit 14 as viewed from the header part 16. FIG. 13A shows the heat exchange unit 14 as viewed in a direction 13A of FIG. 12. FIG. 13B shows the heat exchange unit 14 as viewed in a direction 13B of FIG. 12.

Figure 14A:
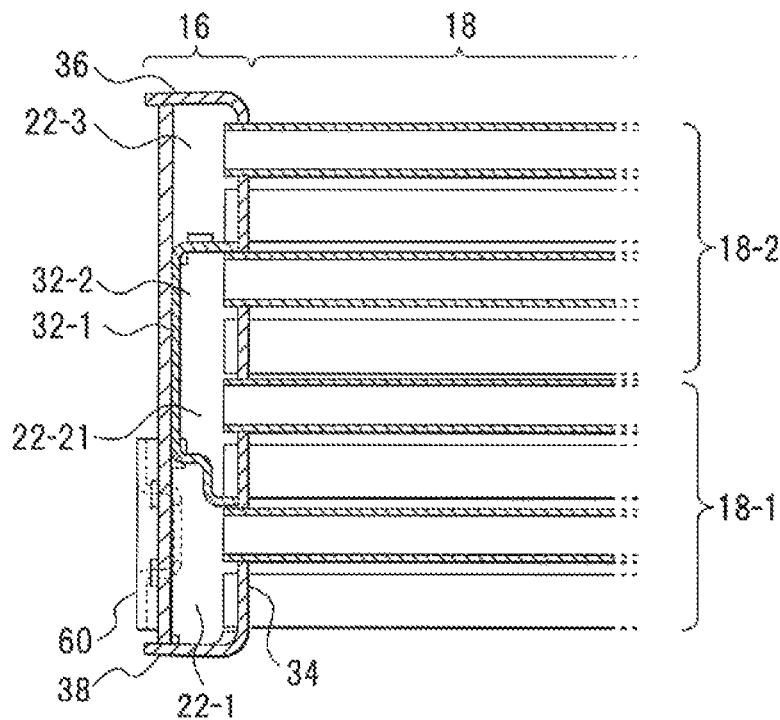
FIG. 14A is a cross-sectional view taken along a line 14A-14A of FIG. 13A.
Figure 14B:
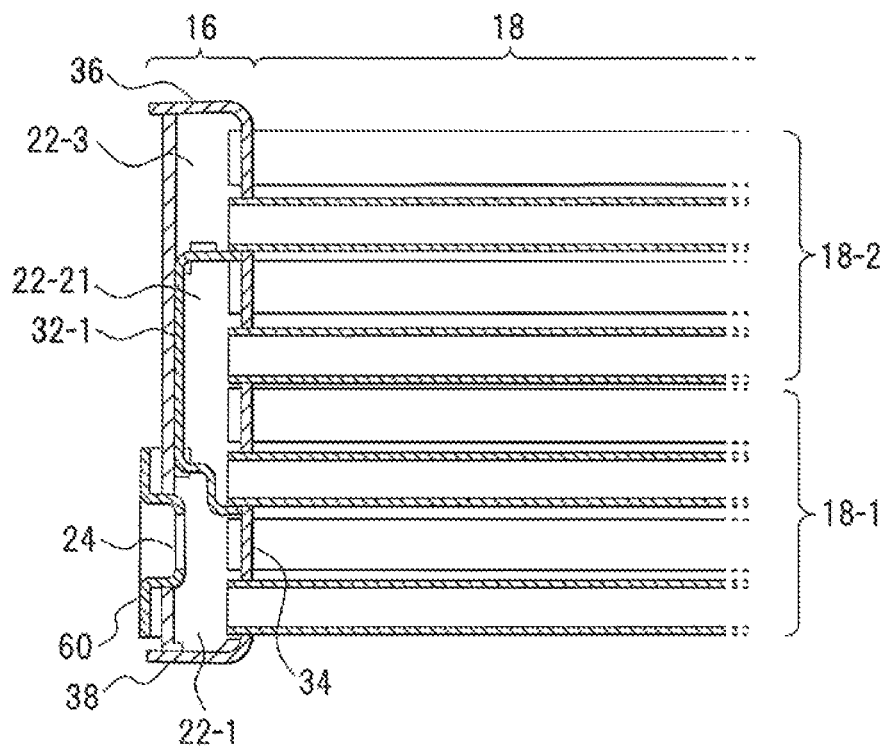
FIG. 14B is a cross-sectional view taken along a line 14B-14B of FIG. 13A.

On the right side of the partition member 32-2 of the header part 16, as shown in FIGS. 14A and 14B, the entry-side chamber 22-1, the pass-through chamber 22-21, and the turn-back chamber 22-3 are formed.

Figure 15A:
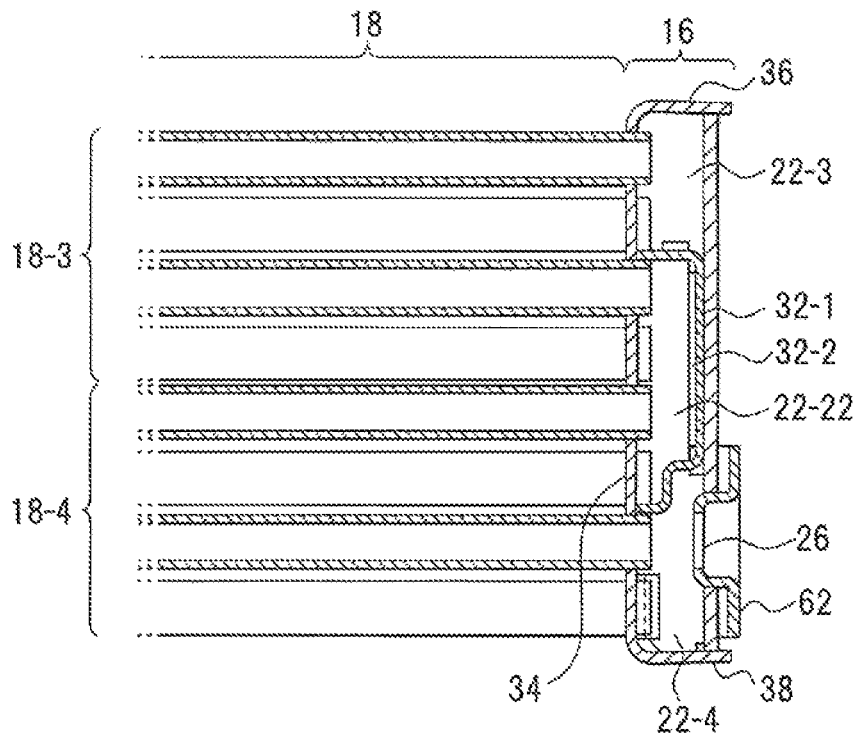
FIG. 15A is a cross-sectional view taken along a line 15A-15A of FIG. 13A.
Figure 15B:
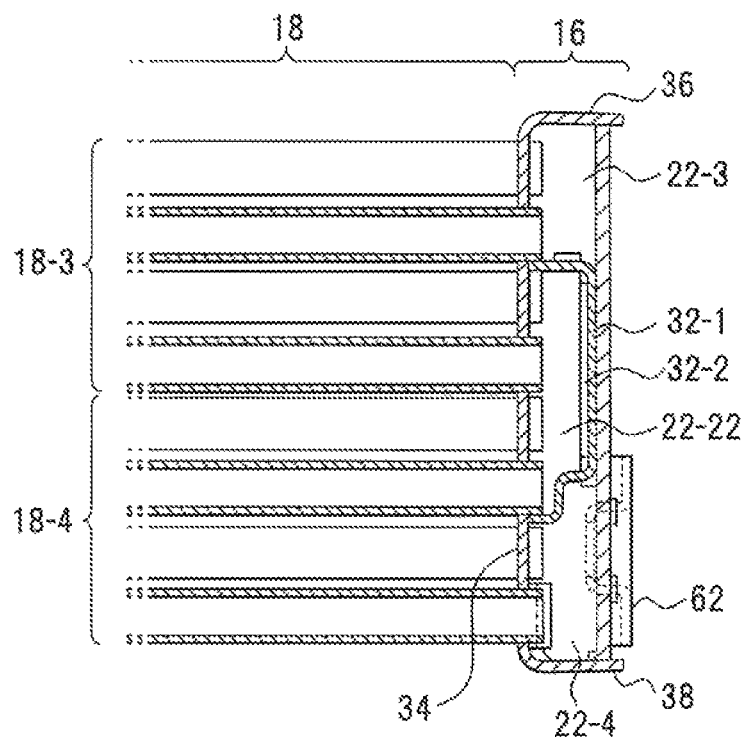
FIG. 15B is a cross-sectional view taken along a line 15B-15B of FIG. 13A.

On the left side of the partition member 32-2 of the header part 16, as shown in FIGS. 15A and 15B, the turn-back chamber 22-3, the pass-through chamber 22-22, and the exit-side chamber 22-4 are formed around the exit-side port 26.

[Relationship of Heat Exchanger Tube Part 18 to Chambers 22-1, 22-21, 22-22, 22-3, 22-4]

Figure 16A:
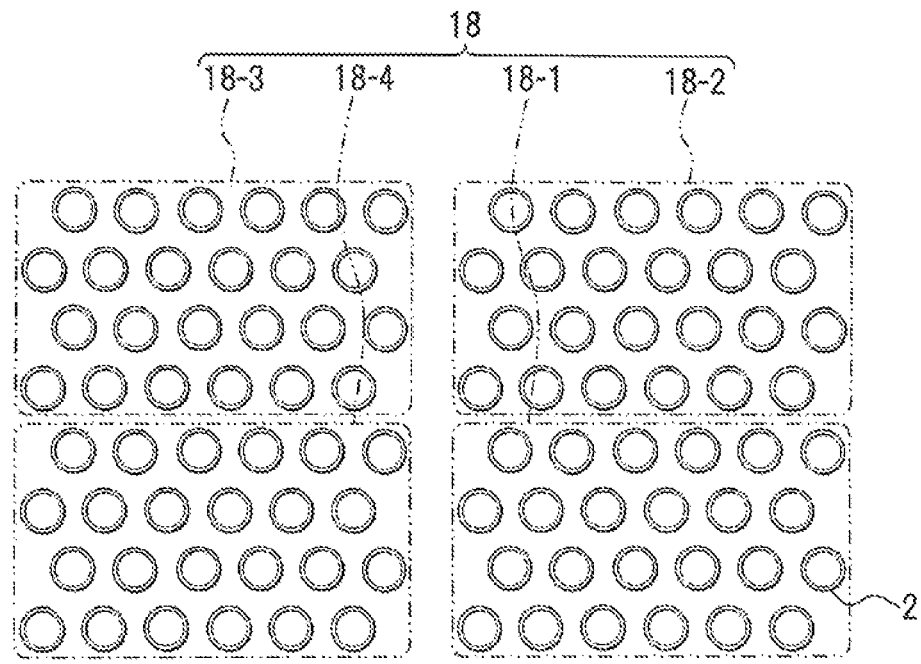
FIG. 16A is a view of grouping of a heat exchanger tube part.
Figure 16B:
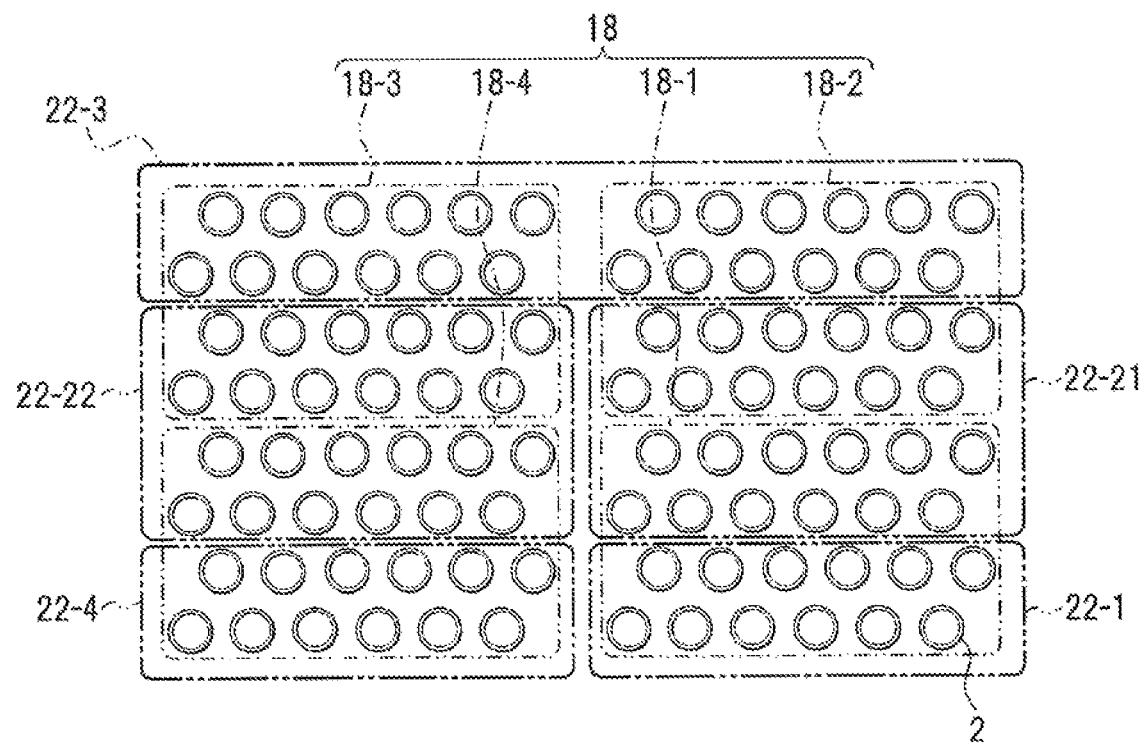
FIG. 16B is a view of a relationship of the heat exchanger tube part to chambers of the header part.

As shown in FIG. 16A, the heat exchanger tube part 18 includes the heat exchanger tube groups 18-1, 18-2, 18-3, 18-4. As shown in FIG. 16B, the header part 16 includes the entry-side chamber 22-1, the pass-through chambers 22-21 and 22-22, the turn-back chamber 22-3, and the exit-side chamber 22-4.

The entry-side chamber 22-1 is connected to the pass-through chamber 22-21 by the heat exchanger tube group 18-1. The pass-through chamber 22-21 is connected to the turn-back chamber 22-3 by the heat exchanger tube group 18-2. The turn-back chamber 22-3 is connected to the pass-through chamber 22-22 by the heat exchanger tube group 18-3. The pass-through chamber 22-22 is connected to the exit-side chamber 22-4 by the heat exchanger tube group 18-4.

The heat exchange unit 14 has a circulation path formed between the entry-side port 24 and the exit-side port 26 through the entry-side chamber 22-1, the heat exchanger tube group 18-1, the pass-through chamber 22-21, the heat exchanger tube group 18-2, the turn-back chamber 22-3, the heat exchanger tube group 18-3, the pass-through chamber 22-22, and the heat exchanger tube group 18-4 to the exit-side chamber 22-4 (FIGS. 10 to 16B). Thus, the water WR entering the entry-side port 24 is heated by the heat of the exhaust gas EG through this circulation path and then taken out from the exit-side port 26.

In the circulation of the water WR, the chambers 22-1, 22-21, 22-22, 22-3, 22-4 are separated by the partition members 32-1, 32-2 to be independent, and thus, the water WR in these chambers is not directly mixed between these chambers. Then, the water WR introduced into the entry-side port 24 can reach the exit-side port 26 with repeating temperature rising due to the heat exchange, without mixing with the water WR before the heat exchange.

[Effects of the Second Embodiment]

According to the second embodiment, the following effects can be obtained.

(1) The fluid to be heated such as the water WR introduced into the entry-side port 24 can be moved to the chambers 22-1, 22-21, 22-22, 22-3, 21-4 with the multiple heat exchanger tubes 2 without mixing with the fluid to be heated after the heat exchange and can be raised in temperature stepwise by the heat exchange in the heat exchanger tubes 2. As a result, a temperature gradient is formed in the fluid to be heated flowing through the chambers 22-1, 22-21, 22-22, 22-3, 22-4.

(2) Since the flow of the fluid to be heated is unidirectional, the fluid resistance is mainly made by only the heat exchanger tubes 2, and the fluid to be heated has high fluidity, so that efficient heat exchange can be implemented.

(3) The heat exchanger tube groups 18-1, 18-2, 18-3, 18-4 each divides the fluid to be heated by the multiple heat exchanger tubes 2, or the 12 heat exchanger tubes 2 in this embodiment, for the heat exchange with the exhaust gas EG. Thus, the heat exchange efficiency can be improved.

(4) The header part 16 is sectioned by the simple partition members 32-1, 32-2 into the multiple chambers, so that fluid resistance due to the inside of the chamber is reduced in this embodiment.

[Flow Passage Function of Header Part 16]

In the heat exchange unit 14, the water WR repeatedly diverges and merges while the heat exchange with the exhaust gas EG is performed. As a result, the water WR is uniformly raised in temperature. The header part 16 includes the multiple chambers 22-1, 22-21, 22-22, 22-3, 22-4, and the chambers 22-1, 22-21, 22-22, 22-3, 22-4 form the flow passage of the water WR. The chambers 22-1, 22-21, 22-22, 22-3, 22-4 are separated by the partition members 32-1, 32-2, and a slight gap is formed between the adjacent chambers due to the partition members 32-1, 32-2. This gap forms a bypass path to a main flow passage of the water WR. The bypass path formed by this gap is a passage having a fluid resistance of the water WR larger than that of the main flow passage of the water WR and allows passage of the water WR. As a result, a function of suppressing the water hammer is obtained.

Third Embodiment

Figure 18A:
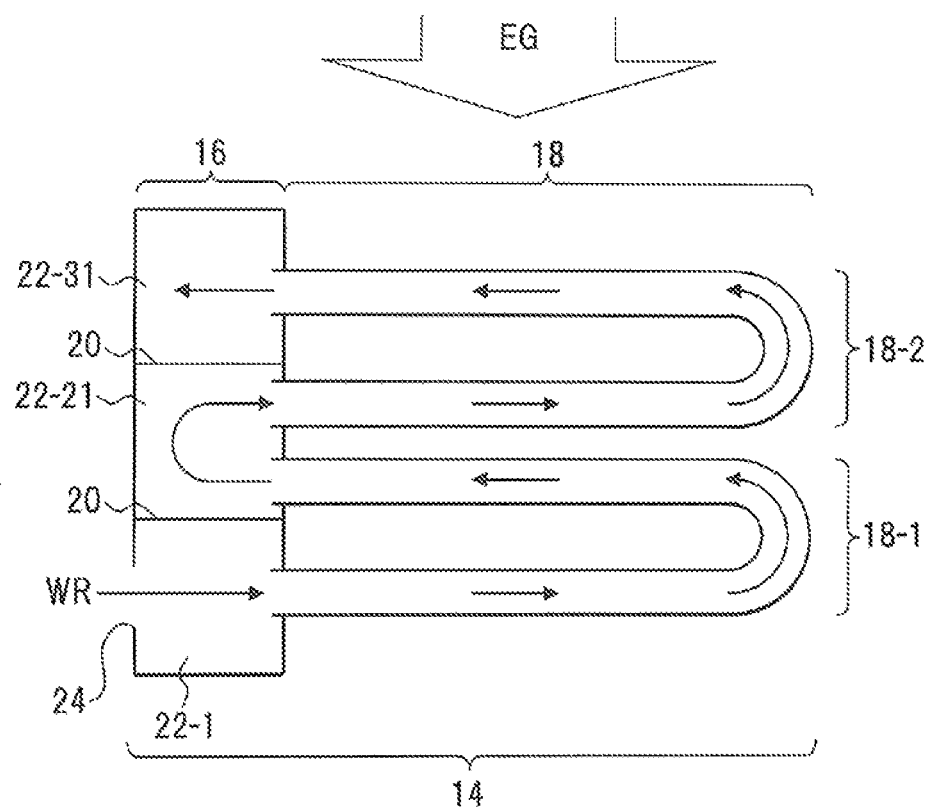
FIG. 18A is a cross-sectional view taken along a line 18A-18A of FIG. 17.
Figure 18B:
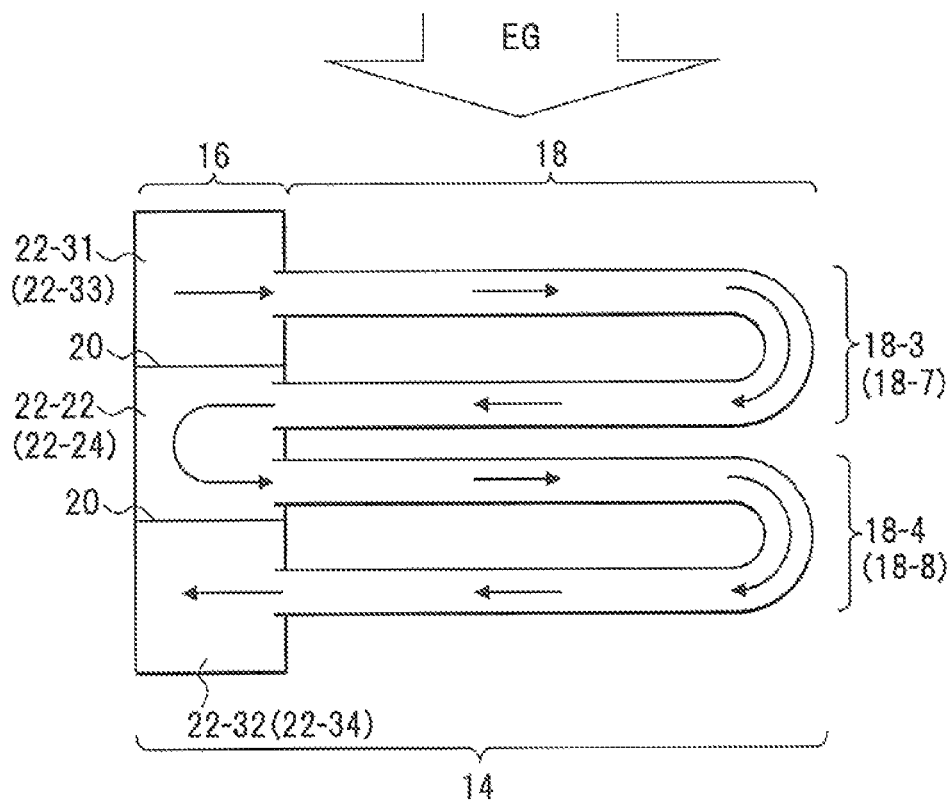
FIG. 18B is a cross-sectional view taken along a line 18B-18B of FIG. 17.
Figure 19A:
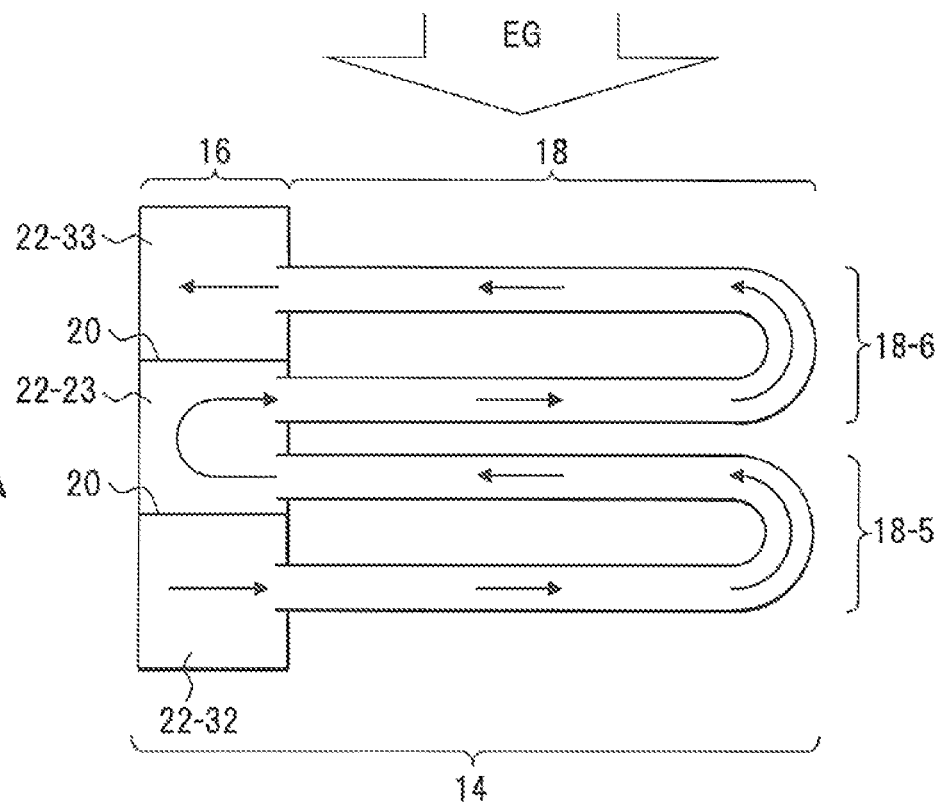
FIG. 19A is a cross-sectional view taken along a line 19A-19A of FIG. 17.
Figure 19B:
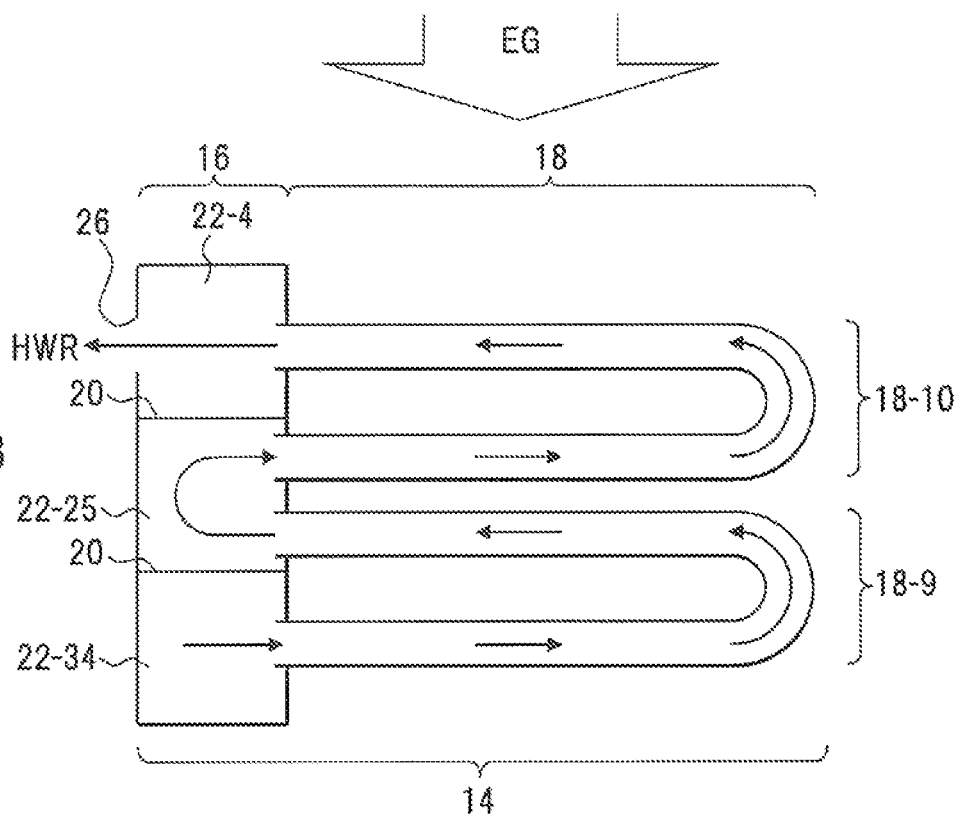
FIG. 19B is a cross-sectional view taken along a line 19B-19B of FIG. 17.

FIG. 17 shows an outline of a heat exchange unit according to a third embodiment. FIG. 18A shows a cross section taken along a line 18A-18A of FIG. 17, and FIG. 18B shows a cross section taken along a line 18B-18B of FIG. 17. FIG. 19A shows a cross section taken along a line 19A-19A of FIG. 17, and FIG. 19B shows a cross section taken along a line 19B-19B of FIG. 17. Configurations shown in FIGS. 17 to 19B are examples, and the present invention is not limited to such a configuration. In FIGS. 17 to 19B, the same portions as those of the heat exchange unit 14 according to the second embodiment are denoted by the same reference numerals.

The heat exchanger tube part 18 of the heat exchange unit 14 according to the third embodiment includes first, second, third, fourth, fifth, sixth, seventh, eighth, ninth, and tenth heat exchanger tube groups 18-1, 18-2, 18-3, 18-4, 18-5, 18-6, 18-7, 18-8, 18-9, 18-10.

While the header part 16 includes five chambers in the second embodiment, the header part 16 of the third embodiment includes 11 chambers. Specifically, the header part 16 includes the entry-side chamber 22-1, pass-through chambers 22-21, 22-22, 22-23, 22-24, 22-25, turn-back chambers 22-31, 22-32, 22-33, 22-34, and the exit-side chamber 22-4.

The entry-side chamber 22-1 includes the entry-side port 24 while the exit-side chamber 22-4 includes the exit-side port 26, and unlike the second embodiment, the entry-side port 24 and the exit-side port 26 are diagonally arranged.

The heat exchanger tube group 18-1 is connected to the entry-side chamber 22-1 and the pass-through chamber 22-21. The heat exchanger tube group 18-2 is connected to the pass-through chamber 22-21 and the turn-back chamber 22-31.

The heat exchanger tube group 18-3 is connected to the turn-back chamber 22-31 and the pass-through chamber 22-22. The heat exchanger tube group 18-4 is connected to the pass-through chamber 22-22 and the turn-back chamber 22-32.

The heat exchanger tube group 18-5 is connected to the turn-back chamber 22-32 and the pass-through chamber 22-23. The heat exchanger tube group 18-6 is connected to the pass-through chamber 22-23 and the turn-back chamber 22-33.

The heat exchanger tube group 18-7 is connected to the turn-back chamber 22-33 and the pass-through chamber 22-24. The heat exchanger tube group 18-8 is connected to the pass-through chamber 22-24 and the turn-back chamber 22-34.

The heat exchanger tube group 18-9 is connected to the turn-back chamber 22-34 and the pass-through chamber 22-25. The heat exchanger tube group 18-10 is connected to the pass-through chamber 22-25 and the exit-side chamber 22-4.

As a result, the water WR introduced from the entry-side port 24 into the entry-side chamber 22-1 is guided as indicated by arrows of FIG. 18A from the entry-side chamber 22-1 through the heat exchanger tube group 18-1, the pass-through chamber 22-21, and the heat exchanger tube group 18-2 to the turn-back chamber 22-31.

The water WR reaching the turn-back chamber 22-31 is guided as indicated by arrows of FIG. 18B through the heat exchanger tube group 18-3, the pass-through chamber 22-22, and the heat exchanger tube group 18-4 to the turn-back chamber 22-32.

The water WR reaching the turn-back chamber 22-32 is guided as indicated by arrows of FIG. 19A through the heat exchanger tube group 18-5, the pass-through chamber 22-23, and the heat exchanger tube group 18-6 to the turn-back chamber 22-33.

The water WR reaching the turn-back chamber 22-33 is guided as indicated by the arrows of FIG. 18B described above through the heat exchanger tube group 18-7, the pass-through chamber 22-24, and the heat exchanger tube group 18-8 to the turn-back chamber 22-34.

The water WR reaching the turn-back chamber 22-34 is guided as indicated by arrows of FIG. 19B from the turn-back chamber 22-34 through the heat exchanger tube group 18-9, the pass-through chamber 22-25, and the heat exchanger tube group 18-10 to the exit-side chamber 22-4 and reaches the exit-side port 26. The water WR flows through the header part 16 and the heat exchanger tube groups 18-1, 18-2, 18-3, 18-4, 18-5, 18-6, 18-7, 18-8, 18-9, 18-10 for heat exchange with the heat of the exhaust gas EG This heat exchange turns the water WR to hot water, and the hot water HWR is led out from the exit-side port 26.

[Heat Exchange Unit 14 According to the Third Embodiment]

Figure 20:
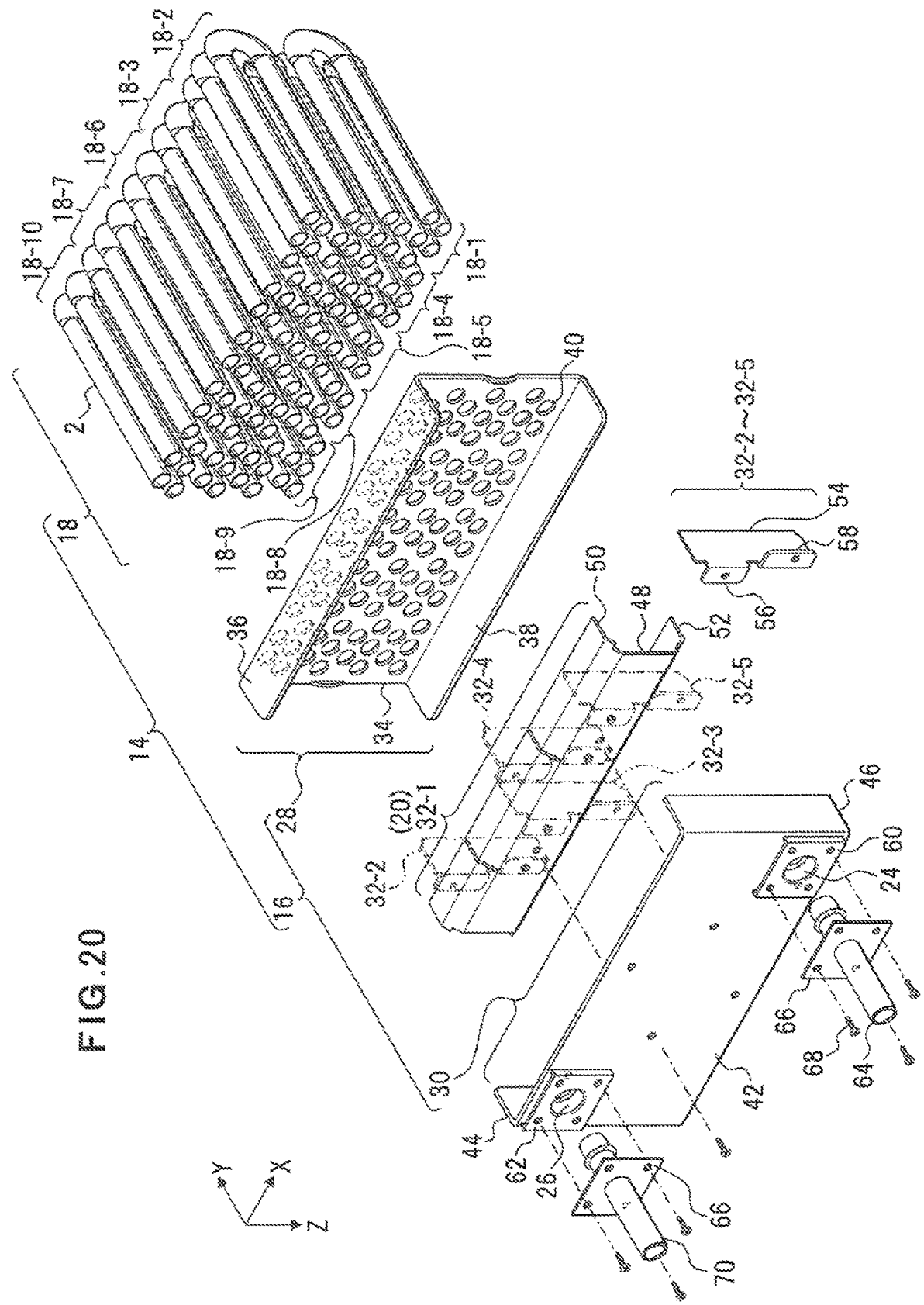
FIG. 20 is an exploded perspective view of the header part.

FIG. 20 shows the heat exchange unit 14 disassembled into components. The configuration shown in FIG. 20 is an example, and the present invention is not limited to such a configuration. In FIG. 20, the same portions as FIG. 10 are denoted by the same reference numerals.

The heat exchanger tube groups 18-1, 18-2, 18-3, 18-4, 18-5, 18-6, 18-7, 18-8, 18-9, 18-10 of the heat exchanger tube part 18 each include the four or five heat exchanger tubes 2 (FIG. 1), so that the heat exchanger tube part 18 includes a total of the 48 heat exchanger tubes 2. Any number of the heat exchanger tubes 2 may be disposed, and the present invention is not limited to these numerical values.

[Header Part 16 According to the Third Embodiment]

The header part 16 includes the heat exchanger tube mounting panel 28, the back panel 30, and partition members 32-1, 32-2, 32-3, 32-4.

The heat exchanger tube mounting panel 28 is a panel member having a C-shaped cross section and enclosing the front surface and the upper and lower surfaces of the header part 16, which is substantially the same as the second embodiment, and therefore will not be described.

The back panel 30 is a panel member having a C-shaped cross section and enclosing the back surface and the left and right side surfaces of the header part 16. The common portions to the second embodiment are denoted by the same reference numerals and will not be described.

The partition members 32-2, 32-3, 32-4 each include the left-right partition wall 54 and the fixed portions 56, 58, and the portions are configured as in the second embodiment.

In this embodiment, the space portion of the header part 16 is sectioned by the partition members 32-1, 32-2, 32-3, 32-4, 32-5 into the entry-side chamber 22-1, the pass-through chambers 22-21, 22-22, 22-23, 22-24, 22-25, the turn-back chambers 22-31, 22-32, 22-33, 22-34, and the exit-side chamber 22-4.

In this embodiment, the entry-side port 24 opening the entry-side chamber 22-1 and the exit-side port 26 opening the exit-side chamber 22-4 are diagonally formed in the port fixing panel portion 42 of the back panel 30.

[Relationship of Heat Exchanger Tube Part 18 to Chambers 22-1, 22-21, 22-22, 22-23, 22-24, 22-25, 22-31, 22-32, 22-33, 22-34, 22]

Figure 21A:
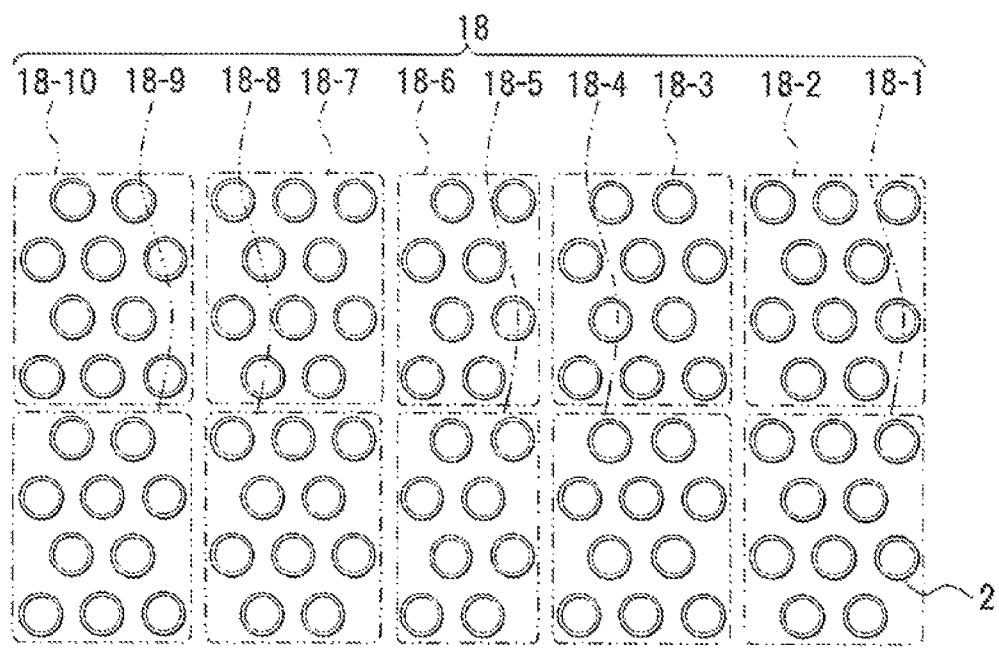
FIG. 21A is a view of grouping of the heat exchanger tube part.
Figure 21B:
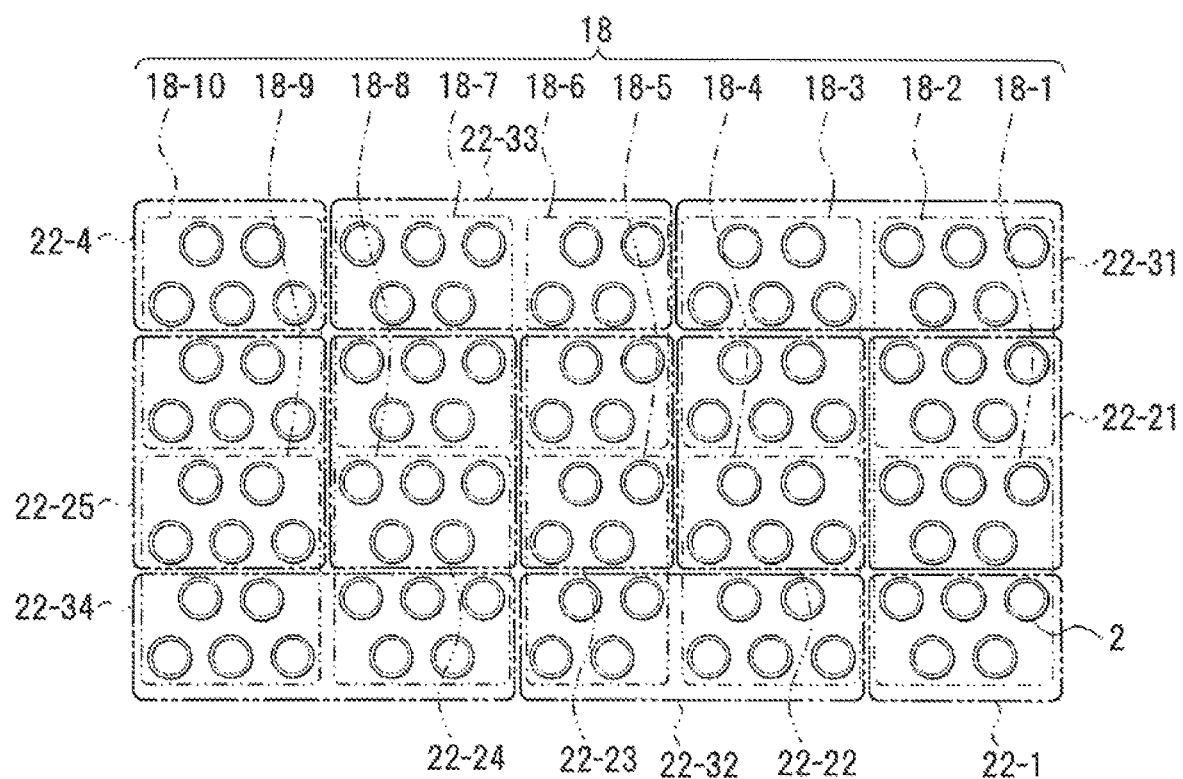
FIG. 21B is a view of a relationship of the heat exchanger tube part to chambers of the header part.

As shown in FIG. 21A, the heat exchanger tube part 18 includes the heat exchanger tube groups 18-1, 18-2, 18-3, 18-4, 18-5, 18-6, 18-7, 18-8, 18-9, 18-10. As shown in FIG. 21B, the header part 16 includes the entry-side chamber 22-1, the pass-through chambers 22-21, 22-22, 22-23, 22-24, 22-25, the turn-back chamber 22-31, 22-32, 22-33, 22-34, and the exit-side chamber 22-4.

The entry-side chamber 22-1 is connected to the pass-through chamber 22-21 by the heat exchanger tube group 18-1.

The pass-through chamber 22-21 is connected to the turn-back chamber 22-31 by the heat exchanger tube group 18-2.

The turn-back chamber 22-31 is connected to the pass-through chamber 22-22 by the heat exchanger tube group 18-3.

The pass-through chamber 22-22 is connected to the turn-back chamber 22-32 by the heat exchanger tube group 18-4.

The turn-back chamber 22-32 is connected to the pass-through chamber 22-23 by the heat exchanger tube group 18-5.

The pass-through chamber 22-23 is connected to the turn-back chamber 22-33 by the heat exchanger tube group 18-6.

The turn-back chamber 22-33 is connected to the pass-through chamber 22-24 by the heat exchanger tube group 18-7.

The pass-through chamber 22-24 is connected to the turn-back chamber 22-34 by the heat exchanger tube group 18-8.

The turn-back chamber 22-34 is connected to the pass-through chamber 22-25 by the heat exchanger tube group 18-9.

The pass-through chamber 22-25 is connected to the exit-side chamber 22-4 by the heat exchanger tube group 18-10.

Thus, in this embodiment, a circulation path is formed between the entry-side port 24 and the exit-side port 26 of the heat exchange unit 14 through the entry-side chamber 22-1, the heat exchanger tube group 18-1, the pass-through chamber 22-21, the heat exchanger tube group 18-2, the turn-back chamber 22-31, the heat exchanger tube group 18-3, the pass-through chamber 22-22, the heat exchanger tube group 18-4, the turn-back chamber 22-32, the heat exchanger tube group 18-5, the pass-through chamber 22-23, the heat exchanger tube group 18-6, the turn-back chamber 22-33, the heat exchanger tube group 18-7, the pass-through chamber 22-24, the heat exchanger tube group 18-8, the turn-back chamber 22-34, the heat exchanger tube group 18-9, the pass-through chamber 22-25, and the heat exchanger tube group 18-10 to the exit-side chamber 22-4 (FIGS. 17 to 21B).

In the circulation of the water WR, the entry-side chamber 22-1, the pass-through chambers 22-21, 22-22, 22-23, 22-24, 22-25, the turn-back chambers 22-31, 22-32, 22-33, 22-34, and the exit-side chamber 22-4 are separated by the partition members 32-1, 32-2, 32-3, 32-4, 32-5 to be independent, and thus, the water WR in these chambers is not directly mixed between these chambers. Then, the water WR introduced into the entry-side port 24 can reach the exit-side port 26 with repeating temperature rising due to the heat exchange, without mixing with the water WR before the heat exchange. The flow passage function of the header part 16 is the same as the second embodiment and therefore will not be described.

[Effects of the Third Embodiment]

According to the third embodiment, the following effects can be obtained.

(1) In the third embodiment, the same effect as the second embodiment can also be obtained.

(2) In the heat exchanger tube part 18 of the third embodiment, the same number of the heat exchanger tubes 2 included in the second embodiment are sectioned into the heat exchanger tube groups 18-1 to 18-10 to section the chambers 22-1, 22-21 to 22-25, 22-31 to 22-34, and 22-4, and the water WR is circulated through sets of the five or four heat exchanger tubes 2, so that the flow rate of the water WR flowing through the exchanger tubes 2 can be increased, and the heat exchange rate of the exhaust gas EG can be increased.

(3) The header part 16 is sectioned by the simple partition members 32-1, 32-2, 32-3, 32-4, 32-5 into the multiple chambers, so that an increase in fluid resistance due to the inside of the chamber is reduced in this example.

Fourth Embodiment

Figure 22:
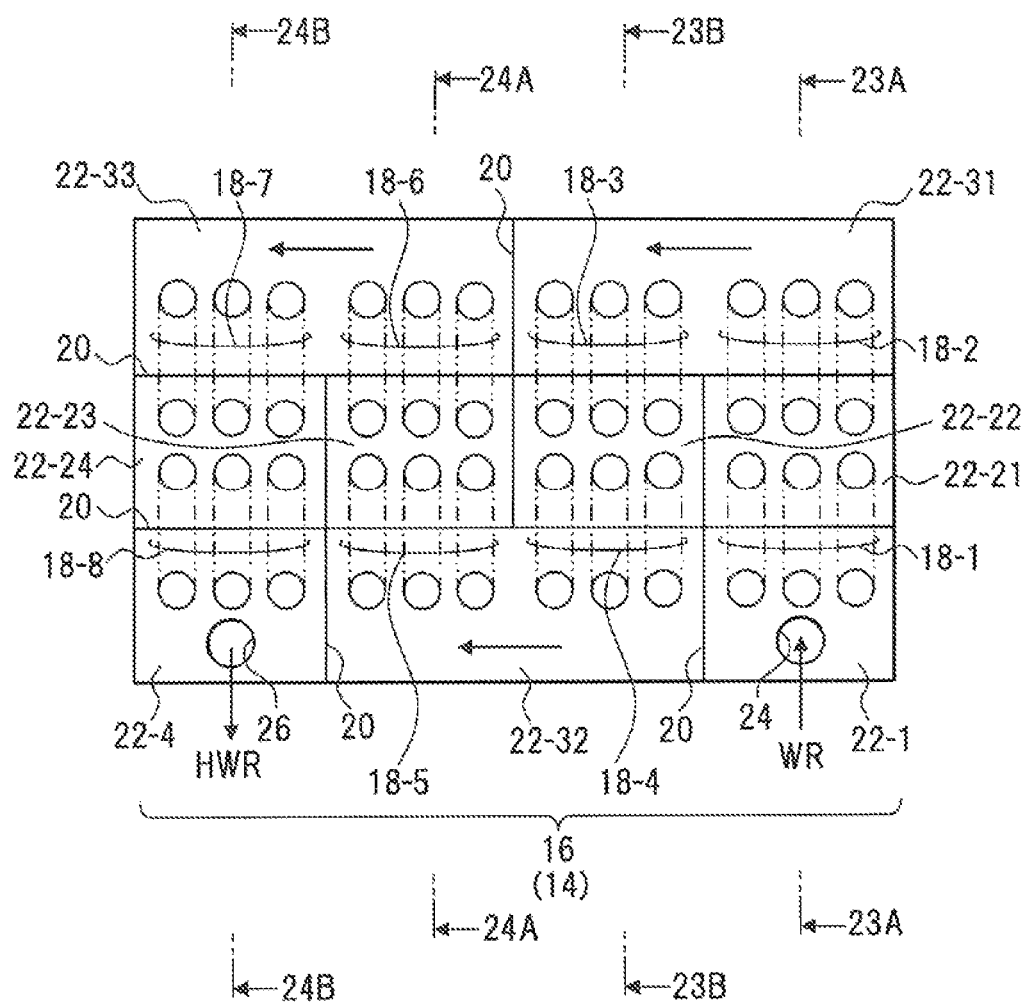
FIG. 22 is a view of a heat exchange unit according to a fourth embodiment.
Figure 23A:
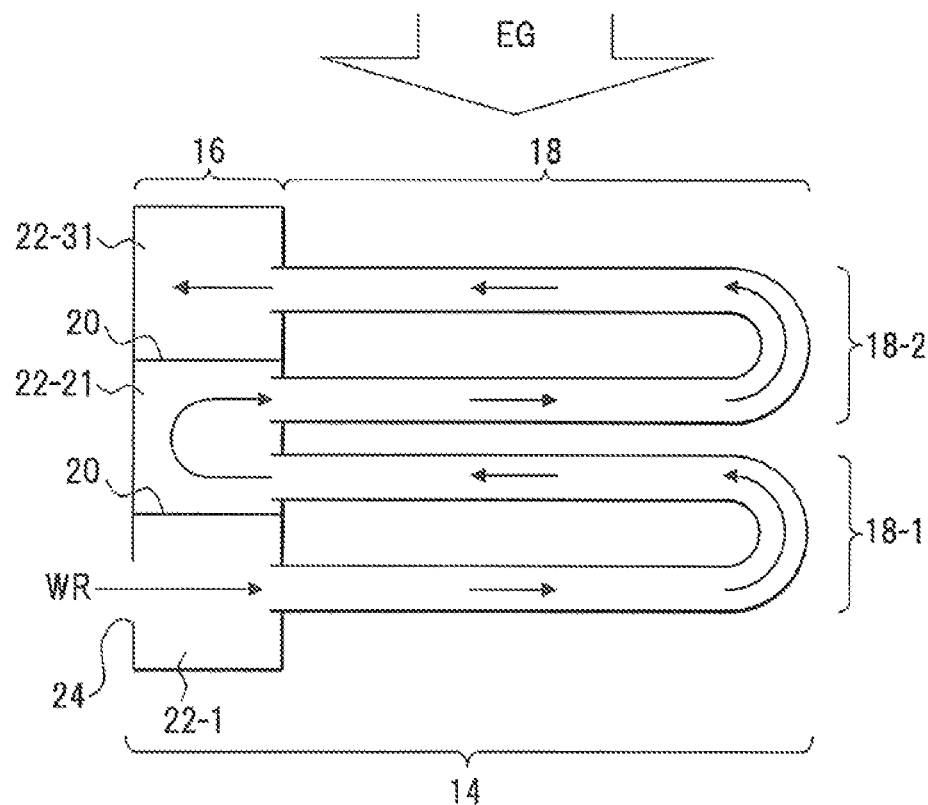
FIG. 23A is a cross-sectional view taken along a line 23A-23A of FIG. 22.
Figure 23B:
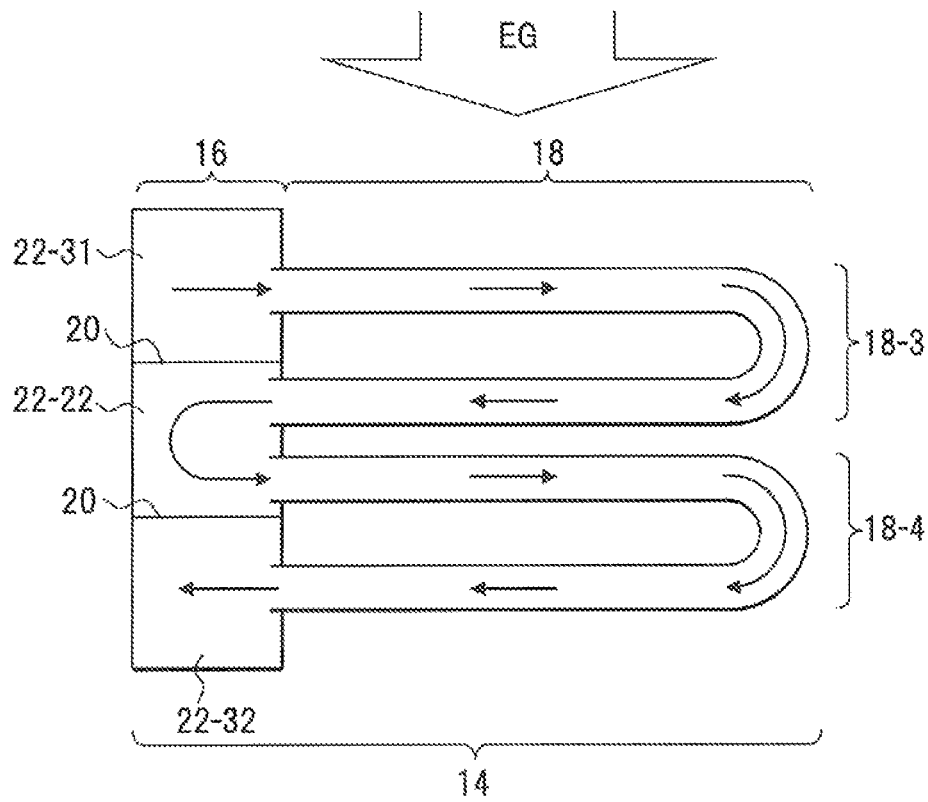
FIG. 23B is a cross-sectional view taken along a line 23B-23B of FIG. 22.
Figure 24A:
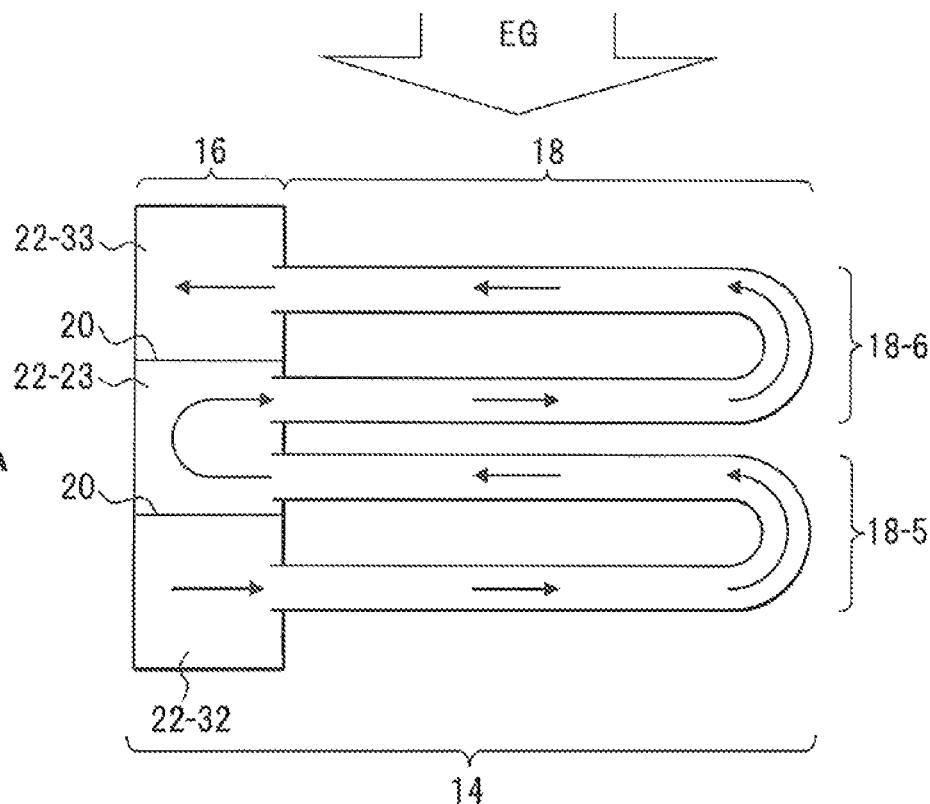
FIG. 24A is a cross-sectional view taken along a line 24A-24A of FIG. 22.
Figure 24B:
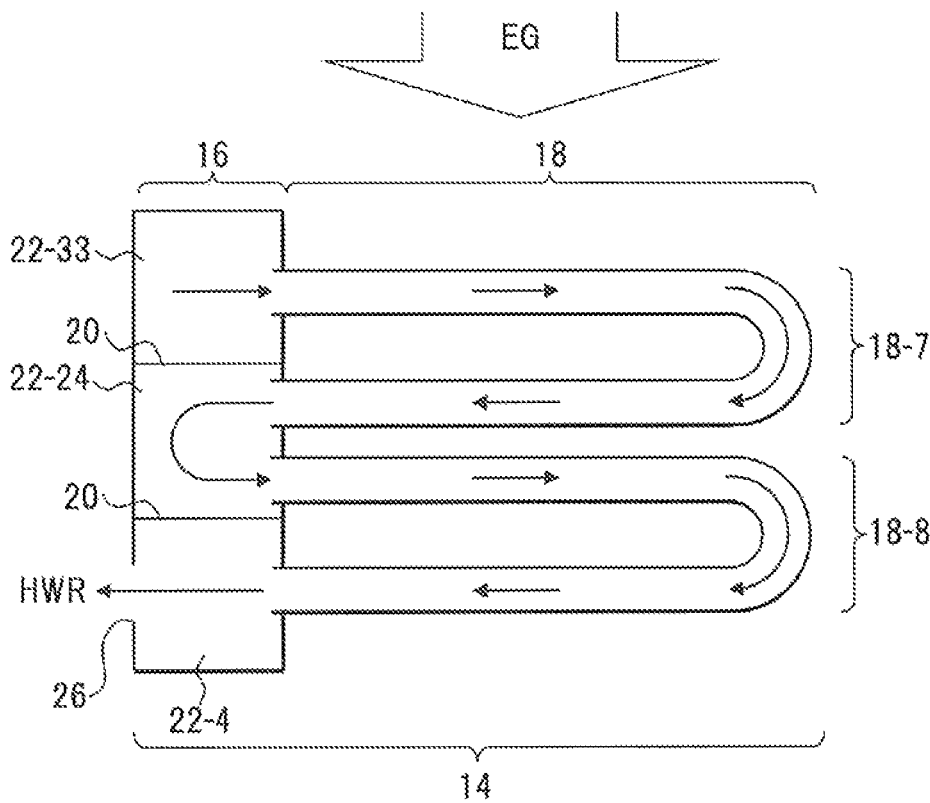
FIG. 24B is a cross-sectional view taken along a line 24B-24B of FIG. 22.

FIG. 22 shows an outline of a heat exchange unit according to a fourth embodiment. FIG. 23A shows a cross section taken along a line 23A-23A of FIG. 22, and FIG. 23B shows a cross section taken along a line 23B-23B of FIG. 22. FIG. 24A shows a cross section taken along a line 24A-24A of FIG. 22, and FIG. 24B shows a cross section taken along a line 24B-24B of FIG. 22. Configurations shown in FIGS. 22 to 24B are examples, and the present invention is not limited to such a configuration. In FIGS. 22 to 24B, the same portions as those of the heat exchange units 14 according to the second and third embodiments are denoted by the same reference numerals.

The header part 16 of the fourth embodiment includes nine chambers, i.e., the entry-side chamber 22-1, the pass-through chambers 22-21, 22-22, 22-23, 22-24, the turn-back chamber 22-31, 22-32, 22-33, and the exit-side chamber 22-4. The heat exchanger tube part 18 includes the first, second, third, fourth, fifth, sixth, seventh, and eighth heat exchanger tube groups 18-1, 18-2, 18-3, 18-4, 18-5, 18-6, 18-7, 18-8.

The entry-side chamber 22-1 includes the entry-side port 24 while the exit-side chamber 22-4 includes the exit-side port 26, and the entry-side port 24 and the exit-side port 26 are arranged as in the second embodiment.

The heat exchanger tube group 18-1 is connected to the entry-side chamber 22-1 and the pass-through chamber 22-21. The heat exchanger tube group 18-2 is connected to the pass-through chamber 22-21 and the turn-back chamber 22-31.

The heat exchanger tube group 18-3 is connected to the turn-back chamber 22-31 and the pass-through chamber 22-22. The heat exchanger tube group 18-4 is connected to the pass-through chamber 22-22 and the turn-back chamber 22-32.

The heat exchanger tube group 18-5 is connected to the turn-back chamber 22-32 and the pass-through chamber 22-23. The heat exchanger tube group 18-6 is connected to the pass-through chamber 22-23 and the turn-back chamber 22-33.

The heat exchanger tube group 18-7 is connected to the turn-back chamber 22-33 and the pass-through chamber 22-24.

The heat exchanger tube group 18-8 is connected to the pass-through chamber 22-24 and the exit-side chamber 22-4.

As a result, the water WR introduced from the entry-side port 24 into the entry-side chamber 22-1 is guided as indicated by arrows of FIG. 23A from the entry-side chamber 22-1 through the heat exchanger tube group 18-1, the pass-through chamber 22-21, and the heat exchanger tube group 18-2 to the turn-back chamber 22-31.

The water WR reaching the turn-back chamber 22-31 is guided as indicated by arrows of FIG. 23B through the heat exchanger tube group 18-3, the pass-through chamber 22-22, and the heat exchanger tube group 18-4 to the turn-back chamber 22-32.

The water WR reaching the turn-back chamber 22-32 is guided as indicated by arrows of FIG. 24A through the heat exchanger tube group 18-5, the pass-through chamber 22-23, and the heat exchanger tube group 18-6 to the turn-back chamber 22-33.

The water WR reaching the turn-back chamber 22-33 is guided as indicated by the arrows of FIG. 24B described above through the heat exchanger tube group 18-7, the pass-through chamber 22-24, and the heat exchanger tube group 18-8 to the exit-side chamber 22-4 and reaches the exit-side port 26. The water WR flows through the header part 16 and the heat exchanger tube groups 18-1, 18-2, 18-3, 18-4, 18-5, 18-6, 18-7, 18-8 for heat exchange with the heat of the exhaust gas EG This heat exchange turns the water WR to hot water, and the hot water HWR is led out from the exit-side port 26.

[Heat Exchange Unit 14 According to the Fourth Embodiment]

Figure 25:
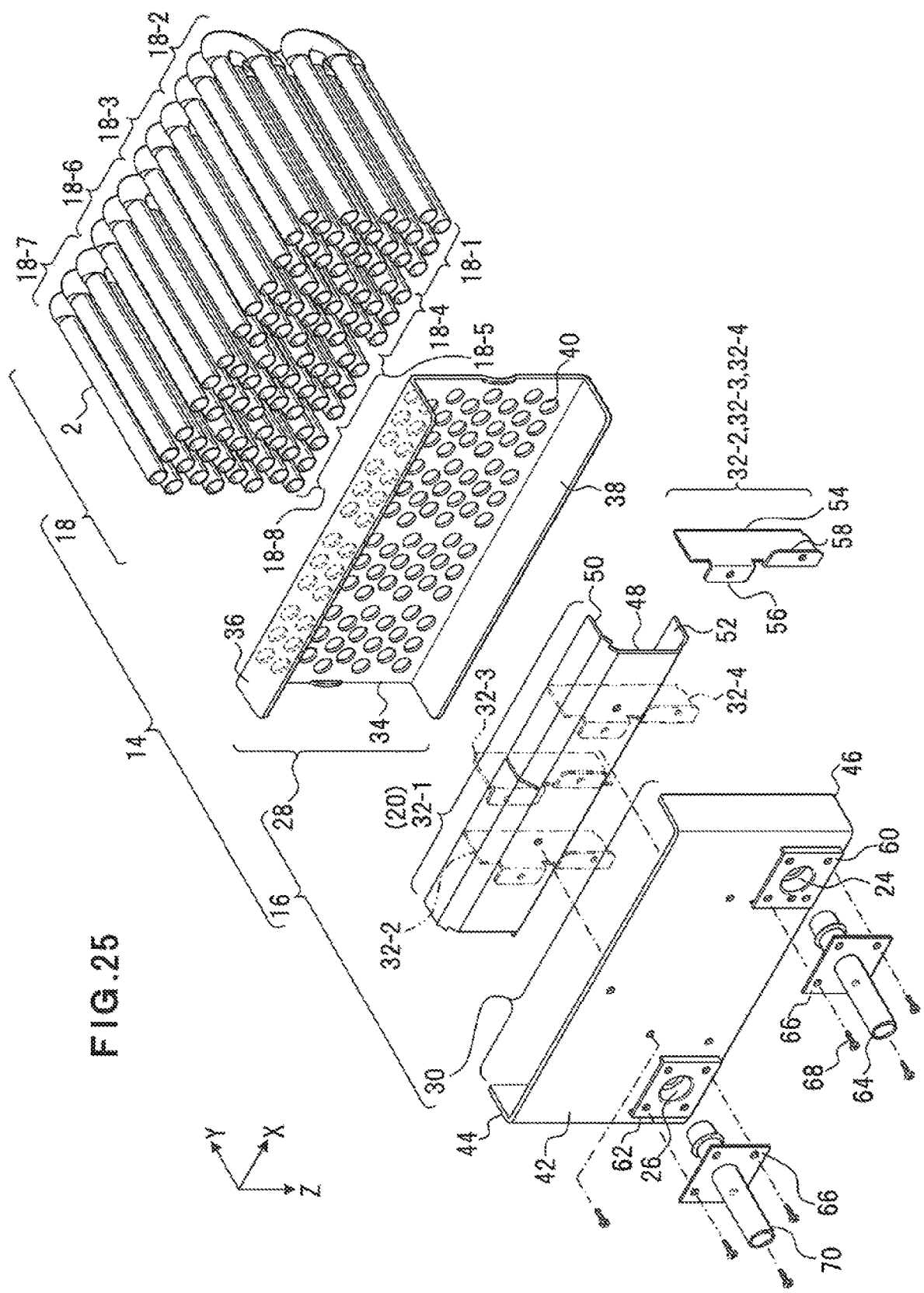
FIG. 25 is an exploded perspective view of the header part.

FIG. 25 shows the heat exchange unit 14 disassembled into components. The configuration shown in FIG. 25 is an example, and the present invention is not limited to such a configuration. In FIG. 25, the same portions as FIG. 10 are denoted by the same reference numerals.

The heat exchanger tube groups 18-1, 18-2, 18-3, 18-4, 18-5, 18-6, 18-7, 18-8 of the heat exchanger tube part 18 each include the six heat exchanger tubes 2 (FIG. 1), so that the heat exchanger tube part 18 include a total of the 48 heat exchanger tubes 2. Any number of the heat exchanger tubes 2 may be disposed, and the present invention is not limited to these numerical values.

[Header Part 16 According to the Fourth Embodiment]

The header part 16 includes the heat exchanger tube mounting panel 28, the back panel 30, and the partition members 32-1, 32-2, 32-3, 32-4.

The heat exchanger tube mounting panel 28 is a panel member having a C-shaped cross section and enclosing the front surface and the upper and lower surfaces of the header part 16, which is substantially the same as the second embodiment, and therefore will not be described.

The back panel 30 is a panel member having a C-shaped cross section and enclosing the back surface and the left and right side surfaces of the header part 16. The common portions to the second embodiment are denoted by the same reference numerals and will not be described.

The partition members 32-2, 32-3, 32-4 each include the left-right partition wall 54 and the fixed portions 56, 58, and the portions are configured as in the second embodiment.

In this embodiment, the space portion of the header part 16 is sectioned by the partition members 32-1, 32-2, 32-3, 32-4 into the entry-side chamber 22-1, the pass-through chambers 22-21, 22-22, 22-23, 22-24, the turn-back chambers 22-31, 22-32, 22-33, and the exit-side chamber 22-4.

In this embodiment, the entry-side port 24 opening the entry-side chamber 22-1 and the exit-side port 26 opening the exit-side chamber 22-4 are formed in the port fixing panel portion 42 of the back panel 30.

[Relationship of Heat Exchanger Tube Part 18 to Entry-Side Chamber 22-1, Pass-Through Chambers 22-21, 22-22, 22-23, 22-24, Turn-Back Chambers 22-31, 22-32, 22-33, and Exit-Side Chamber 22-4]

Figure 26A:
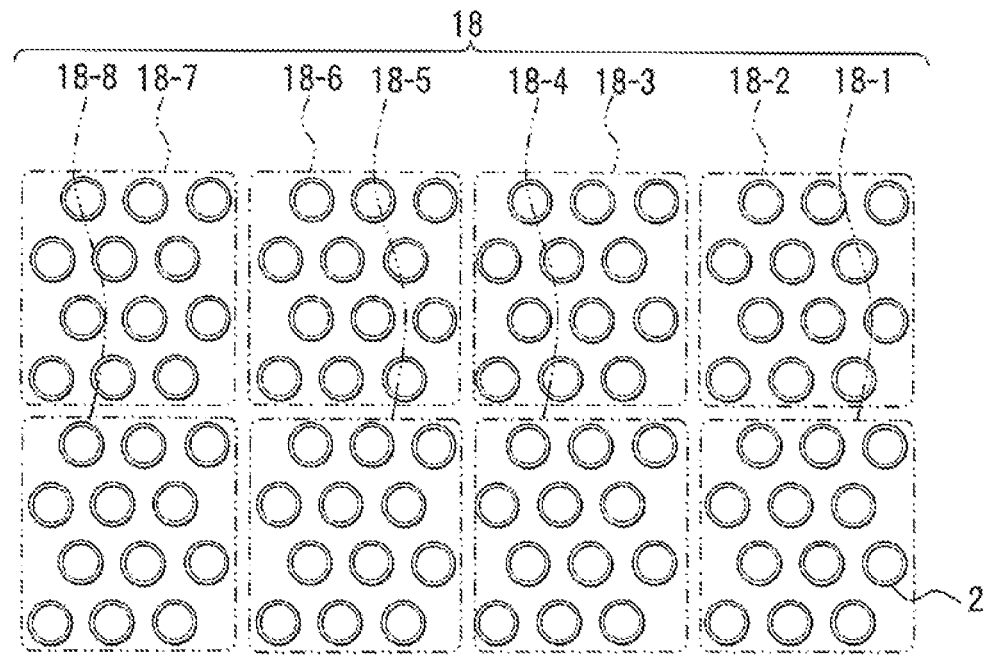
FIG. 26A is a view of grouping of the heat exchanger tube part.
Figure 26B:
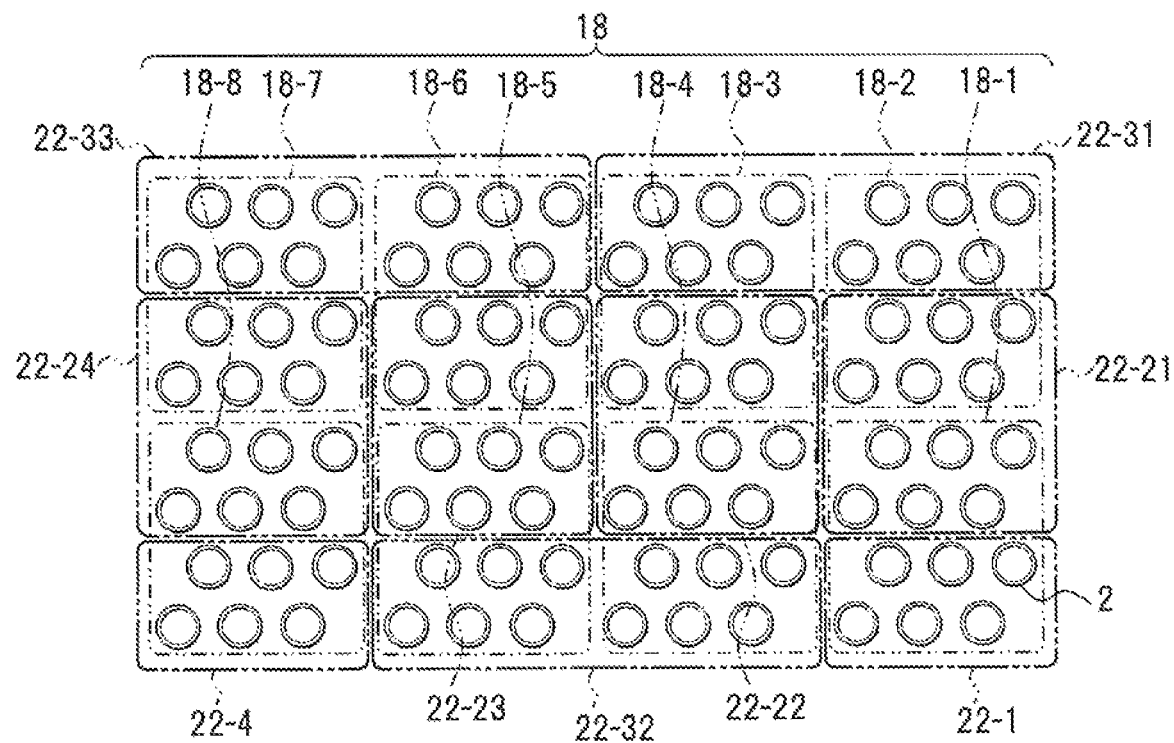
FIG. 26B is a view of a relationship of the heat exchanger tube part to chambers of the header part.

As shown in FIG. 26A, the heat exchanger tube part 18 includes the heat exchanger tube groups 18-1, 18-2, 18-3, 18-4, 18-5, 18-6, 18-7, 18-8. As shown in FIG. 26B, the header part 16 includes the entry-side chamber 22-1, the pass-through chambers 22-21, 22-22, 22-23, 22-24, the turn-back chambers 22-31, 22-32, 22-33, and the exit-side chamber 22-4.

The entry-side chamber 22-1 is connected to the pass-through chamber 22-21 by the heat exchanger tube group 18-1.

The pass-through chamber 22-21 is connected to the turn-back chamber 22-31 by the heat exchanger tube group 18-2.

The turn-back chamber 22-31 is connected to the pass-through chamber 22-22 by the heat exchanger tube group 18-3.

The pass-through chamber 22-22 is connected to the turn-back chamber 22-32 by a heat exchanger tube group 18-4.

The turn-back chamber 22-32 is connected to the pass-through chamber 22-23 by the heat exchanger tube group 18-5.

The pass-through chamber 22-23 is connected to the turn-back chamber 22-33 by the heat exchanger tube group 18-6.

The turn-back chamber 22-33 is connected to the pass-through chamber 22-24 by the heat exchanger tube group 18-7.

The pass-through chamber 22-24 is connected to the exit-side chamber 22-4 by the heat exchanger tube group 18-8.

Thus, in this embodiment, a circulation path is formed between the entry-side port 24 and the exit-side port 26 of the heat exchange unit 14 through the entry-side chamber 22-1, the heat exchanger tube group 18-1, the pass-through chamber 22-21, the heat exchanger tube group 18-2, the turn-back chamber 22-31, the heat exchanger tube group 18-3, the pass-through chamber 22-22, the heat exchanger tube group 18-4, the turn-back chamber 22-32, the heat exchanger tube group 18-5, the pass-through chamber 22-23, the heat exchanger tube group 18-6, the turn-back chamber 22-33, the heat exchanger tube group 18-7, the pass-through chamber 22-24, and the heat exchanger tube group 18-8 to the exit-side chamber 22-4 (FIGS. 22 to 26B).

In the circulation of the water WR, the entry-side chamber 22-1, the pass-through chambers 22-21, 22-22, 22-23, 22-24, the turn-back chambers 22-31, 22-32, 22-33, and the exit-side chamber 22-4 are separated by the partition members 32-1, 32-2, 32-3, 32-4 to be independent, and thus, the water WR in these chambers is not directly mixed between these chambers. Then, the water WR introduced into the entry-side port 24 can reach the exit-side port 26 with repeating temperature rising due to the heat exchange, without mixing with the water WR before the heat exchange. The flow passage function of the header part 16 is the same as the second embodiment and therefore will not be described.

[Effects of the Fourth Embodiment]

According to the fourth embodiment, the following effects can be obtained.

(1) In the fourth embodiment, the same effect as the second embodiment can also be obtained.

(2) In the heat exchanger tube part 18 of the fourth embodiment, the same number of the heat exchanger tubes 2 included in the second embodiment are sectioned into the heat exchanger tube groups 18-1 to 18-8 to section the chambers 22-1, 22-21 to 22-24, 22-31 to 22-33, and 22-4, and the water WR is circulated through sets of the six heat exchanger tubes 2, so that the flow rate of the water WR flowing through the exchanger tubes 2 can be increased as compared to the second embodiment while the number of sections is made smaller than that of the third embodiment, and the heat exchange rate of the exhaust gas EG can be increased.

(3) The header part 16 is sectioned into the multiple chambers by a smaller number of the partitioning members 32-1, 32-2, 32-3, 32-4 as compared to the third embodiment, so that fluid resistance due to the inside of the chamber is reduced in this example.

[Relationship of Chambers and Heat Exchanger Tubes 2]

If the diameters of the heat exchanger tubes 2 disposed in the heat exchange unit 14 are the same, a difference in the number of the heat exchanger tubes constituting the heat exchanger tube group is reflected in the flow rate of the water WR flowing through the heat exchanger tubes. The numbers of constituent tubes in the embodiments are 12 (FIG. 10), four at minimum (FIG. 20), and six (FIG. 25). For the purpose of calculation, when it is assumed that the flow rate per tube is "1" in the heat exchange unit 14 of FIG. 10, the flow rate is "3" in the heat exchange unit 14 of FIG. 20 and "2" in the heat exchange unit 14 shown in FIG. 25. Actually, the gap between the chambers cannot be ignored. When the water WR flows at 24 [liter/min], a ratio of a flow rate [m/s] is 0.2:1.1:0.8. Considering the Reynolds number, 0.7 [m/s] or more of the flow rate is necessary for the water flow to become turbulent flow, or the water flow becomes laminar flow at 0.7 [m/s] or less of the flow rate. In the laminar flow, the heat exchange with the exhaust gas EG is limited to the water flow on the tube wall side of the heat exchanger tube 2, and the exhaust gas EG cannot be brought into contact with all the water WR flowing through the heat exchanger tube 2, so that the heat exchanger efficiency decreases.

In the heat exchange units 14 shown in FIGS. 20 and 25, 0.7 [m/s] or more of the flow rate makes the water WR the turbulent flow so that a high heat exchange efficiency is obtained. A difference of the flow rate value such as 1.1 [m/s] and 0.8 [m/s] has little effect on the heat exchange rate or the heat exchange efficiency, and instead, the flow passage or flow of the exhaust gas EG has an influence.

Fifth Embodiment

[Heat Exchange Apparatus 74]

Figure 27:
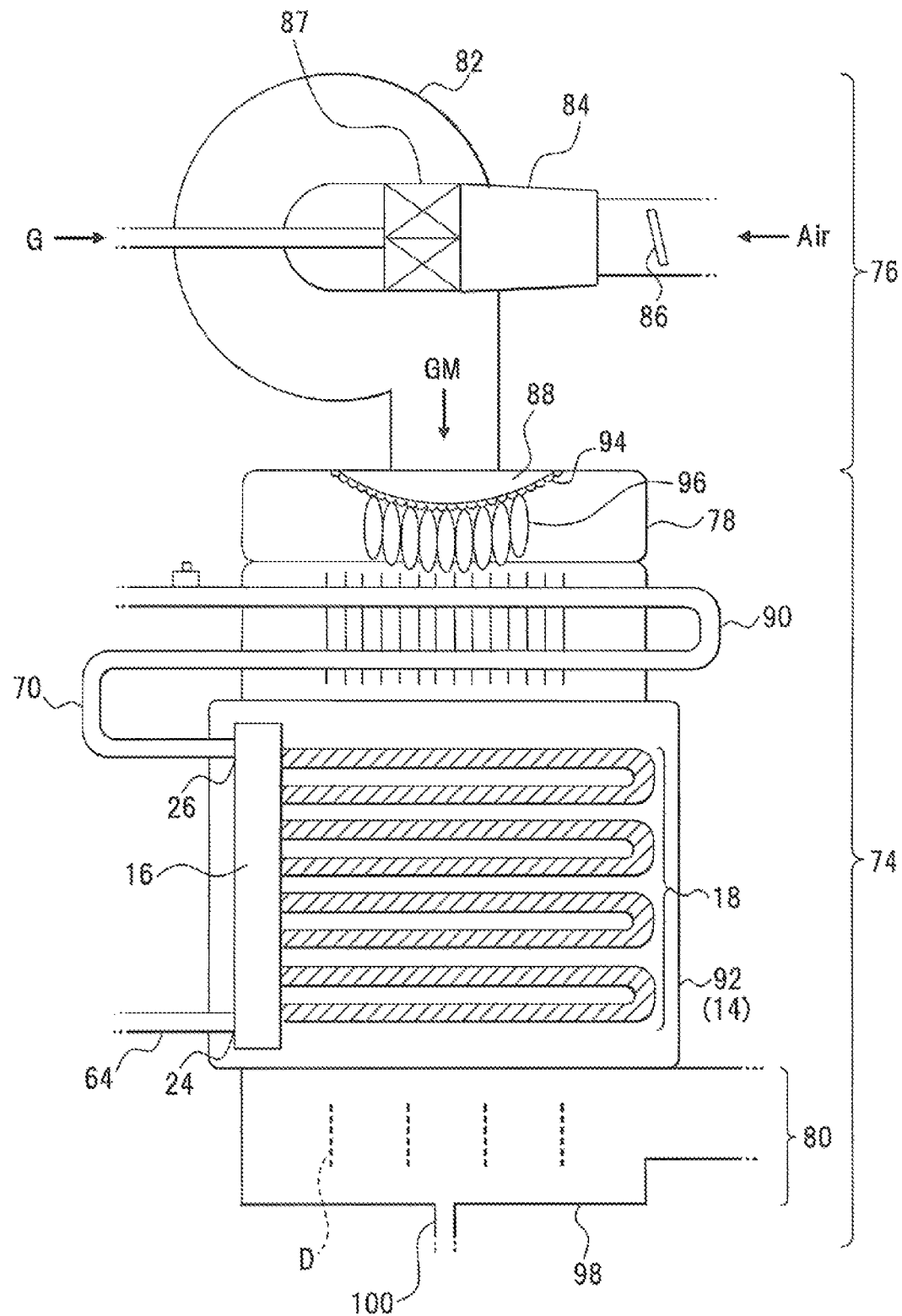
FIG. 27 is a view of a heat exchange apparatus according to a fifth embodiment.

FIG. 27 shows a heat exchange apparatus according to a fifth embodiment. The configuration shown in FIG. 27 is an example, and the present invention is not limited to such a configuration.

In the heat exchange apparatus 74, the heat exchange unit 14 described above is used as a secondary heat exchanger. The heat exchange apparatus 74 includes a mixing unit 76, a combustion housing 78, and an exhaust unit 80.

The mixing unit 76 includes an air supply fan 82 and a venturi part 84. The venturi part 84 is supplied with a fuel gas G and an air (Air), and the fuel gas G and the air are mixed by the venturi function to form an air-fuel mixture GM. A supply amount of air flowing through the venturi part 84 is adjusted by the rotation of the air supply fan 82 and the opening degree of an air adjustment valve 86. Depending on this air supply amount, the fuel gas G is introduced into the venturi part 84 according to the opening degree of the gas adjustment valve 87.

The combustion housing 78 includes a metal knit burner 88, a primary heat exchanger 90, and a secondary heat exchanger 92. The metal knit burner 88 is an example of a combustion means including a metal knit 94 on a combustion surface. The air-fuel mixture GM flows from a back surface of the metal knit burner 88 toward the combustion surface, and a flame 96 is generated on a surface of the metal knit 94, and the exhaust gas EG is generated.

The primary heat exchanger 90 is disposed on the upstream side with respect to the flow of the exhaust gas EG and mainly transfers the sensible heat of the exhaust gas EG to the water WR.

The secondary heat exchanger 92 is disposed on the downstream side of the primary heat exchanger 90 with respect to the flow of the exhaust gas EG and mainly transfers the latent heat of the exhaust gas EG after the heat exchange to the water WR.

The exhaust gas EG passing through the secondary heat exchanger 92 is discharged to the outside air through the exhaust unit 80. The heat exchange unit 14 described above is used for this secondary heat exchanger 92, and the same portions as FIGS. 8 to 16B are denoted by the same reference numerals and will not be described.

This exhaust unit 80 includes a drain receiver 98 on the lower side of the secondary heat exchanger 92. A drain D generated on the secondary heat exchanger 92 is accumulated in the drain receiver 98 and discharged to the outside from a drain port 100.

The water WR is guided from the water supply tube 64 to the entry-side port 24 of the heat exchange unit 14. The primary heat exchanger 90 is connected to the exit-side port 26 by the water discharge tube 70. The water discharge tube 70 is an example of a conduit allowing passage of the water WR. The water WR after the heat exchange in the heat exchange unit 14 is introduced into the primary heat exchanger 90 through this water discharge tube 70. Thus, the water WR is heated by the heat exchange unit 14 and is then heated again by the primary heat exchanger 90 with the heat of the exhaust gas EG In this example, the heat exchange unit 14 is used for the secondary heat exchanger 92; however, this heat exchange unit 14 may be used for the primary heat exchanger 90.

[Effects of the Fifth Embodiment]

According to the fifth embodiment, the following effects can be obtained.

(1) Since the heat exchanger tube 2 described above is used in the heat exchange apparatus 74, the density of the heat exchanger tubes 2 per unit volume can be increased.

(2) Since the density of the heat exchanger tubes 2 is increased, the heat exchange efficiency can be improved, and the volume occupied by the heat exchange unit 14 of the heat exchange apparatus 74 can be reduced, so that the heat exchange apparatus 74 can be made compact and reduced in size.

Sixth Embodiment

[Hot Water Supply System]

Figure 28:
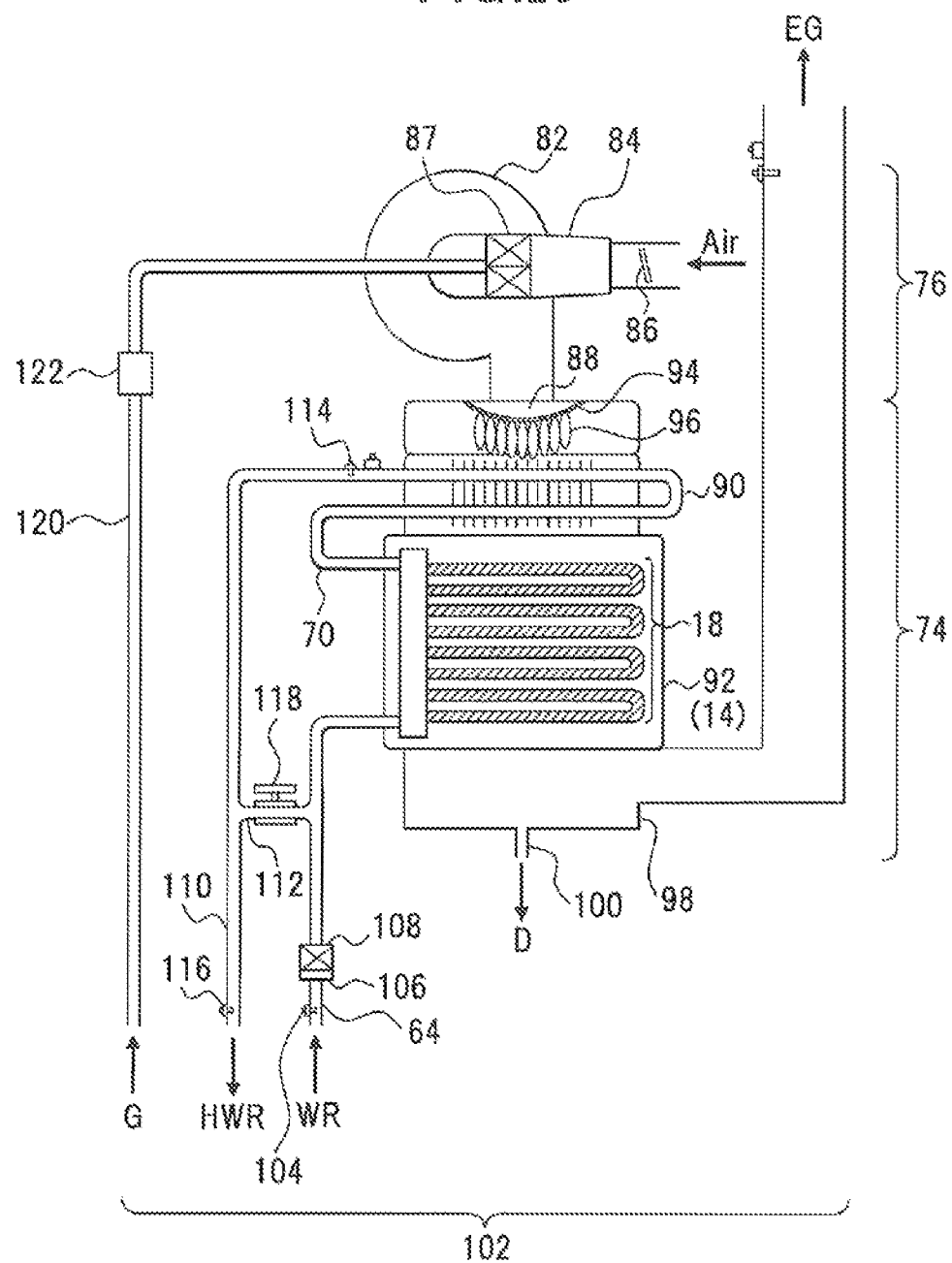
FIG. 28 is a view of a hot water supply system according to a sixth embodiment.

FIG. 28 shows a hot water supply system according to a sixth embodiment. The configuration shown in FIG. 28 is an example, and the present invention is not limited to such a configuration.

The hot water supply system 102 includes the heat exchange apparatus 74 described above. The same portions as FIG. 27 are denoted by the same reference numerals and will not be described.

To the water supply tube 64, the water WR is supplied from a tap, for example. The water supply tube 64 includes a temperature sensor 104, a flowing water sensor 106, and a water supply valve 108. The temperature sensor 104 detects the temperature of the water WR. The flowing water sensor 106 detects a flowing water entering the water supply tube 64. The water supply valve 108 is used for adjusting a water supply amount.

A hot water discharge tube 110 is connected to the exit side of the primary heat exchanger 90. The hot water discharge tube 110 and the water supply tube 64 are connected by a bypass tube 112. The hot water discharge tube 110 includes a temperature sensor 114 and a mixed temperature sensor 116. The temperature sensor 114 detects a hot water temperature on the exit side of the primary heat exchanger 90. The mixed temperature sensor 116 detects the mixed temperature of the hot water HWR and the water WR. The bypass tube 112 includes a bypass valve 118. The bypass valve 118 is used for adjusting a mixed amount of the water WR relative to the hot water HWR through adjustment of an opening degree.

A gas supply tube 120 is connected to the mixing unit 76, and the fuel gas G is supplied through the gas supply tube 120. The gas supply tube 120 includes a gas valve 122. The gas valve 122 is used for adjustment of an amount of the fuel gas flowing from the gas supply tube 120 to the mixing unit 76.

[Control Part]

Figure 29:
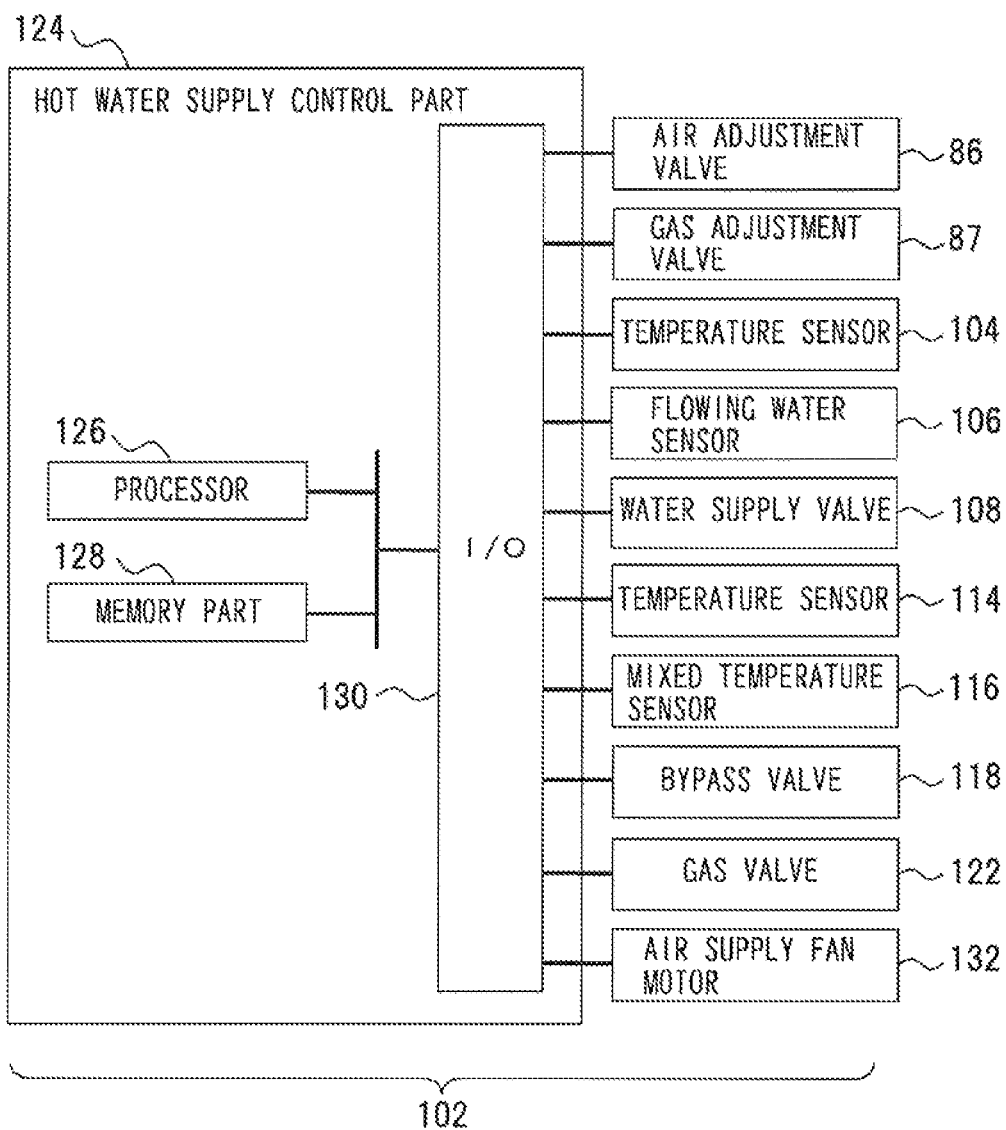
FIG. 29 is a view of a control part of the hot water supply system.

FIG. 29 shows a hot water supply control part 124 of the hot water supply system 102. The hot water supply control part 124 has a hot water supply control function executed by a computer. Thus, the hot water supply control part 124 includes a processor 126, a memory part 128, and an input/output part (I/O) 130.

The processor 126 executes an OS (Operating System) and various control programs stored in the memory part 128. The memory part 128 stores the OS, the control programs, and various control data. For the memory part 128, a recording medium such as a ROM (Read-Only Memory), a RAM (Random-Access Memory), and an EEPROM (Electrically Erasable Programmable Read-Only Memory) is used, and a hard disk device or a semiconductor memory is used. The RAM constitutes a work area for the hot water supply control, calculation, etc.

The I/O 130 is used for input/output of data. The I/O 130 is connected to the air adjustment valve 86, the gas adjustment valve 87, the temperature sensor 104, the flowing water sensor 106, the water supply valve 108, the temperature sensor 114, the mixed temperature sensor 116, the bypass valve 118, and the gas valve 122. Detection signals from these sensors are taken into the I/O 130 under the control of the processor 126, and a control output obtained by the processor 126 is output from the I/O 130 to control functional parts such as the water supply valve 108. An air supply fan motor 132 rotates the air supply fan 82 described above.

[Hot Water Supply Operation]

Figure 30:
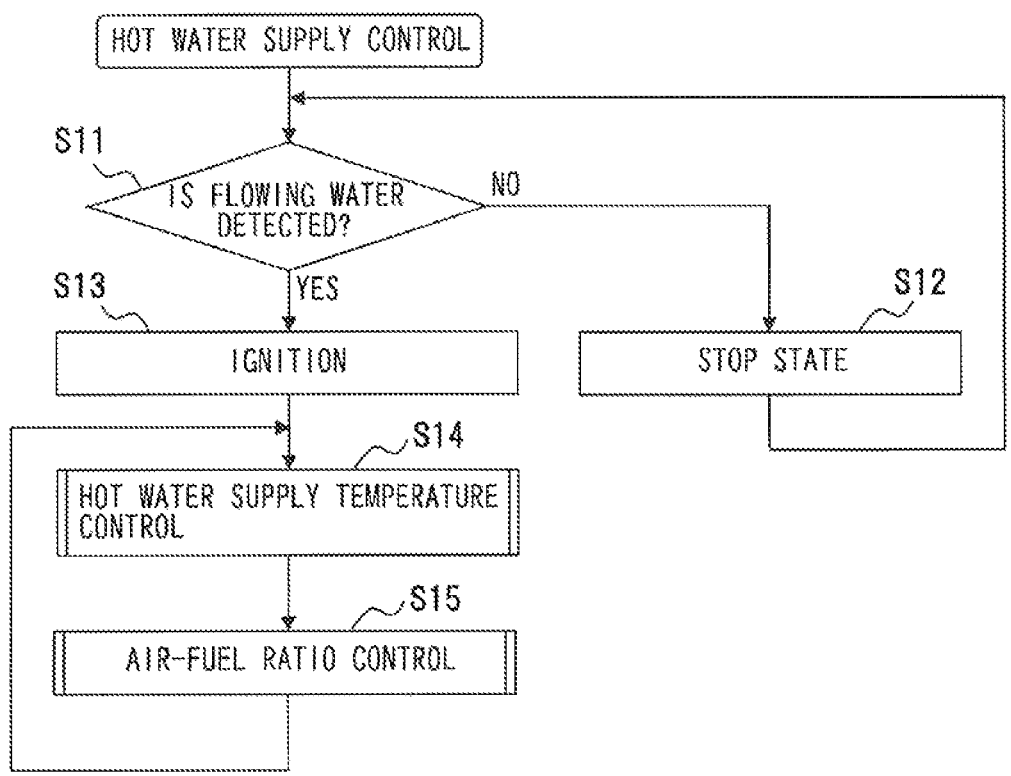
FIG. 30 is a flowchart of a process procedure of a hot water supply control.

FIG. 30 shows a process procedure of the hot water supply control of the hot water supply system 102. This process procedure is an example of the control function of the hot water supply system 102, and the present invention is not limited to such a function.

When the water supply valve 108 of the water supply tube 64 is opened, the water WR flows into the water supply tube 64. The presence/absence of a water flow of the water WR is detected by the flowing water sensor 106.

In this process procedure, the start of the hot water supply control is triggered by the detection of the flowing water by the flowing water sensor 106, and it is determined whether flowing water is detected (S11). If no flowing water exists (NO at S11), this leads to a stop state (S12), and the process returns to S11. Thus, a standby state is maintained.

If the flowing water exists (YES at S11), the metal knit burner 88 is ignited (S13) and this leads to a combustion state.

As a result, a hot water supply temperature control (S14) and an air-fuel ratio control (S15) are provided so that hot water controlled to a set temperature is supplied.

[Effects of the Sixth Embodiment]

According to the sixth embodiment, the following effects can be obtained.

(1) According to the hot water supply system 102, by allowing the flowing water WR to flow in the water supply tube 64, the hot water HWR controlled to the set temperature can be discharged from the hot water discharge tube 110.

(2) Regarding the discharge of hot water, since the heat exchanger tubes 2 and the heat exchange unit 14 described above are included in the secondary heat exchanger 92, hot water can be discharged with high heat exchange efficiency.

Seventh Embodiment

Figure 31A:
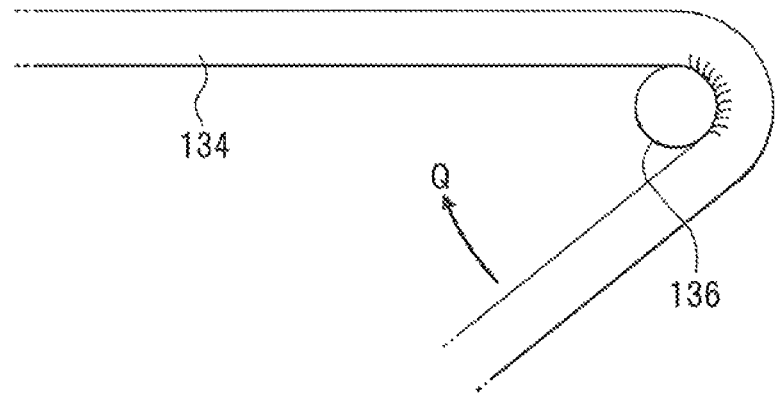
FIGS. 31A, 31B, and 31C are views of a tube used in a method of manufacturing a heat exchanger tube according to a seventh embodiment.
Figure 31B:
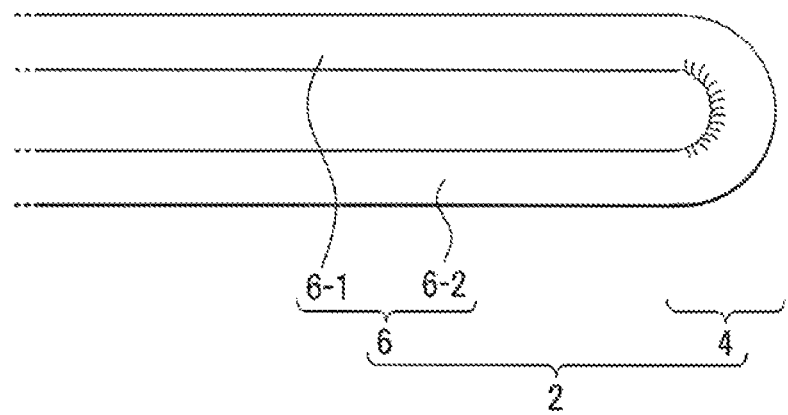
Figure 31C:
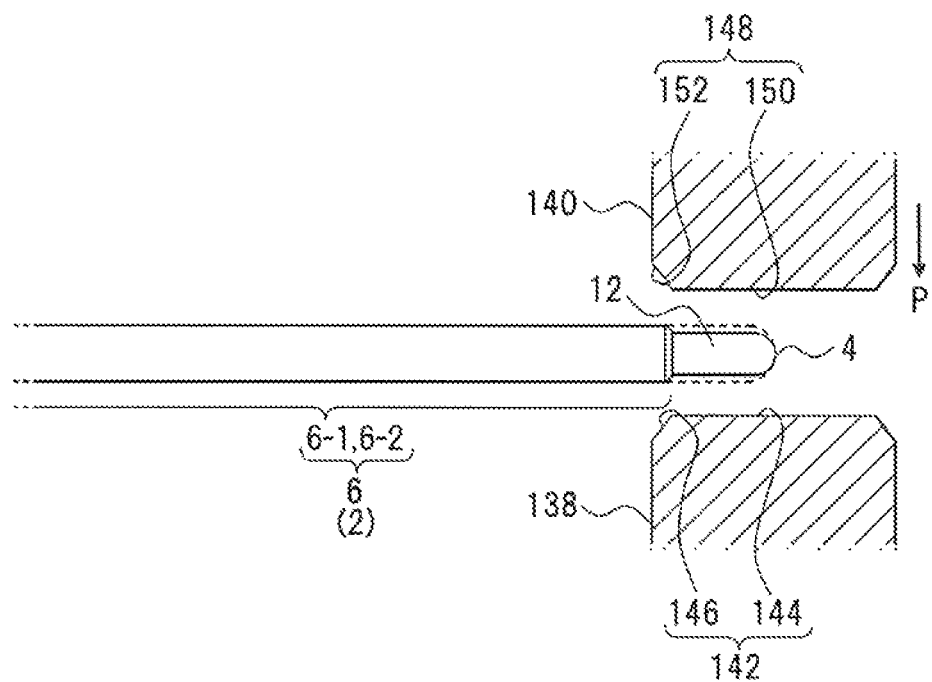

FIGS. 31A to 31C show an example of a manufacturing process of a heat exchanger tube according to a seventh embodiment. This manufacturing process is an example of a method of manufacturing a heat exchanger tube.

This manufacturing process includes a processing step of the turn-back portion 4, an adjustment step of the heat exchanger tube 2, and a shaping step of the turn-back portion 4.

In the processing step of the turn-back portion 4, as shown in FIG. 31A, for example, a seamless pipe 134 is used as a pipe suitable for the heat exchanger tube 2. An intermediate portion of the seamless pipe 134 is touched to a jig 136 having a curved surface corresponding to the inner diameter of the turn-back portion 4 of the heat exchanger tube 2, and the seamless pipe 134 is bent in the direction of an arrow Q while the linear shape of the seamless pipe 134 is maintained, so that the turn-back portion 4 is formed. The position of formation of the turn-back portion 4 may be heated to improve the formability.

After forming the turn-back portion 4, as shown in FIG. 31B, the seamless pipe 134 is adjusted to have a shape before shaping of the flattened portion 12 at the adjustment step. This adjustment results in the heat exchanger tube 2 provided with the U-shaped reciprocating conduit portion.

Subsequently, at the shaping process of the turn-back portion 4, as shown in FIG. 31C, shaping dies 138, 140 are used. A shaping surface 142 of the shaping die 138 includes a flat portion 144 and a tapered portion 146, and the heat exchanger tube 2 before shaping is disposed on the shaping surface 142.

A shaping surface 148 of the shaping die 140 includes a flat portion 150 and a tapered portion 152 as in the shaping die 138. On the shaping surface 142 of the shaping die 138, the heat exchanger tube 2 before shaping is disposed. When a pressure P is applied to the shaping die 140, the shaping die 140 is pressed against the heat exchanger tube 2 on the shaping die 138 with the pressure P. As a result, the flattened portion 12 is formed in the turn-back portion 4 of the heat exchanger tube 2.

[Effect of Seventh Embodiment]

(1) The heat exchanger tube 2 can easily be shaped from a flat seamless pipe.

(2) A flattened width of the flattened portion 12 of the heat exchanger tube 2 can be controlled to a standardized width by adjusting a space during pressurization between the shaping dies 138, 140.

(3) By using the heat exchanger tubes 2 formed in this way, the heat exchange unit 14 shown in FIGS. 13A and 13B can be manufactured.

(4) By inserting and welding the heat exchanger tubes 2 in the mounting holes 40 of the heat exchanger tube mounting panel 28, the heat exchanger tube part 18 can be manufactured.

(5) By combining the partition members 32-1, 32-2 before fixing the back panel 30 to the heat exchanger tube mounting panel 28 and by combining and integrating the back panel 30 provided with the partition members 32-1, 32-2 with the heat exchange tube mounting panel 28 by welding, the heat exchange unit 14 can be obtained.

Eighth Embodiment

Figure 32:
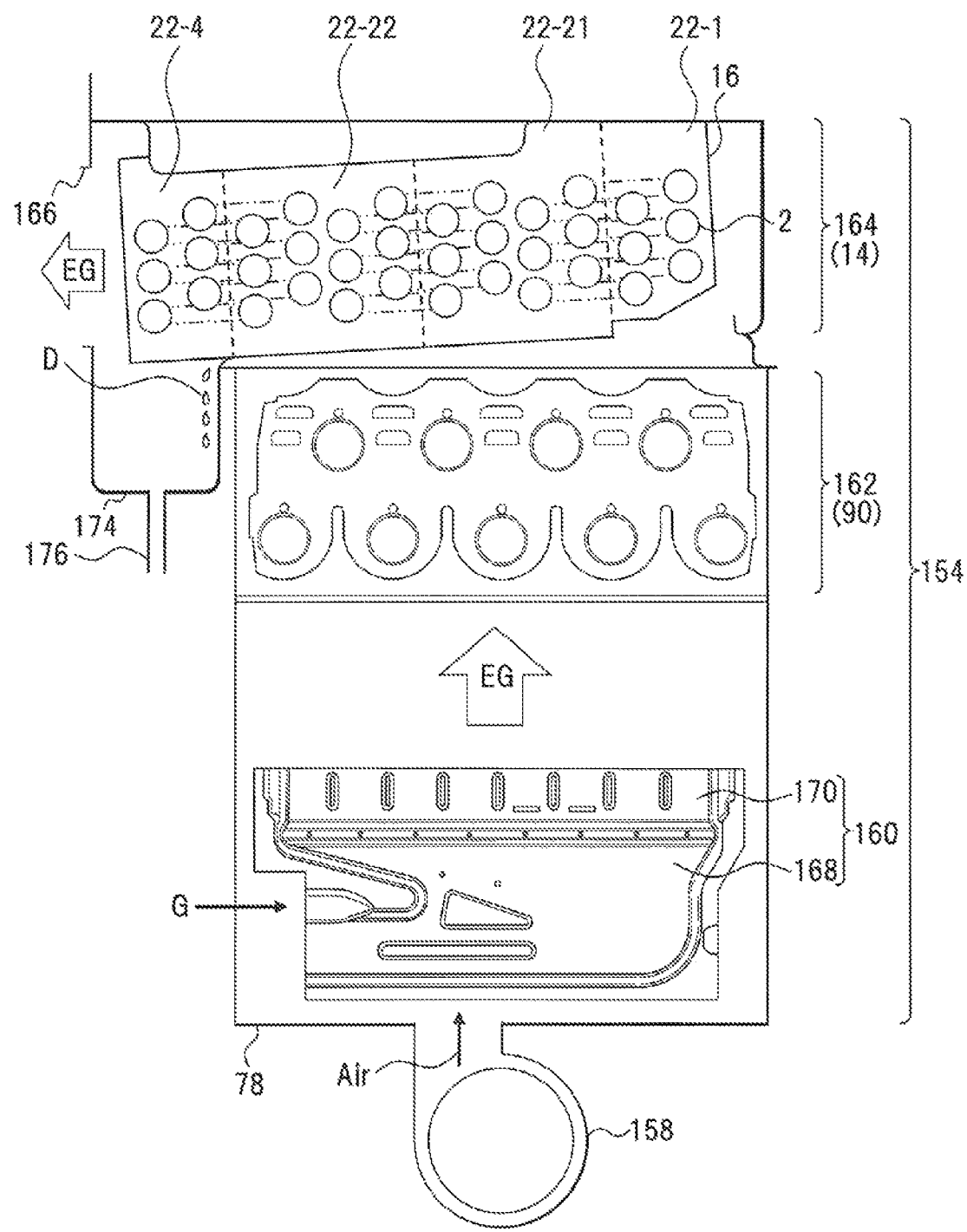
FIG. 32 is a view of a heat exchange apparatus according to an eighth embodiment.

Although the metal knit burner 88 is disposed above the heat exchange unit 14 in the embodiment described above, the heat exchange unit 14 may be disposed above a burner. FIG. 32 shows a heat exchange apparatus according to an eighth embodiment in which the heat exchange unit 14 is disposed above the burner.

A heat exchange apparatus 154 according to this embodiment includes the single combustion housing 78, for example. The combustion housing 78 is provided with an air supply fan 158 in a lower portion, and an inner part of the combustion housing 78 is provided with a combustion part 160, a primary heat exchanger 162, and a secondary heat exchanger 164 from the bottom side. The inner part of the combustion housing 78 is provided with an exhaust portion 166 on the top side. The combustion part 160 includes a mixing unit 168 and a burner 170.

The mixing unit 168 is supplied with the fuel gas G from a fuel supply tube, and the fuel gas G is mixed with the air (Air) to form the air-fuel mixture GM. This air-fuel mixture GM is supplied from the mixing unit 168 to the burner 170 and combusted. The exhaust gas EG generated by this combustion passes through the primary heat exchanger 162 and reaches the exhaust portion 166 through the secondary heat exchanger 164.

The primary heat exchanger 162 is disposed on the upstream side with respect to the flow of the exhaust gas EG and mainly transfers the sensible heat of the exhaust gas EG to the water WR.

The heat exchanger unit 14 described above is disposed in the secondary heat exchanger 164, and the details of this heat exchange unit 14 are as described above except the absence of the turn-back chambers and therefore will not be described.

The secondary heat exchanger 164 mainly transfers to the water WR before heat exchange the latent heat of the exhaust gas EG after heat exchange, that is, the latent heat of the exhaust gas EG reduced in temperature as compared to the upstream side. The drain D resulting therefrom is accumulated in a drain receiver 174 disposed on the lower side of the secondary heat exchanger 164 and discharged through a drain pipe 176 to the outside of the combustion housing 78.

[Effects of the Eighth Embodiment]

According to the eighth embodiment, the same effects as the sixth embodiment can be obtained.

Other Embodiments (1) In the fifth and sixth embodiments, the single heat exchanger unit 14 is included in the secondary heat exchanger; however, multiple heat exchange units may be included in the secondary heat exchanger in a form of individually heating multiple kinds of fluid to be heated.

(2) In the embodiments, the header part 16 of the heat exchange unit 14 is disposed inside the combustion housing. However, the header part 16 may be disposed outside the combustion housing.

(3) In the embodiments, a seamless pipe is used for the heat exchanger tube 2. However, a corrugated pipe having multiple folds may be used, or the multiple turn-back portions 4 may be included in an intermediate portion.

Aspects of the heat exchanger tube, the heat exchange unit, the heat exchange apparatus, the hot water supply system, or the method of manufacturing a heat exchanger tube extracted from the embodiments described above are as follows.

According to an aspect of the heat exchanger tube, the heat exchanger tube for transferring a heat of an exhaust gas to a fluid to be heated includes a turn-back portion formed in an intermediate portion of the heat exchanger tube, and a reciprocating conduit portion. The reciprocating conduit portion includes a conduit portion leading from a starting end of the heat exchanger tube to the turn-back portion, and a conduit portion leading from the turn-back portion to a terminal end of the heat exchanger tube. A space equal to or greater than the outer diameter of the conduit portions is provided between these conduit portions.

In the heat exchanger tube, the turn-back portion may include a flattened portion that is a conduit flattened in a direction orthogonal to a curved surface.

In the heat exchanger tube, the heat exchanger tube may be a seamless tube made of a corrosion resistant metal including stainless steel.

According to an aspect of the heat exchange unit, the heat exchange unit for transferring heat of an exhaust gas to a fluid to be heated includes a heat exchanger tube part including one or more heat exchanger tubes allowing the fluid to be heated to flow through the one or more heat exchanger tubes, and a header part including a plurality of chambers coupled by the heat exchanger tube part, the chambers forming a flow passage of the fluid to be heated through the heat exchanger tube part.

In the heat exchange unit, the heat exchanger tube part may include a plurality of the heat exchanger tubes. The heat exchanger tubes may be coupled to the chambers of the header part.

In the heat exchange unit, the heat exchanger tube part may include a plurality of the heat exchanger tubes. The heat exchanger tubes may each include a turn-back portion having a flattened portion flattened in a direction orthogonal to a curved surface of the turn-back portion, a conduit portion leading from a starting end to the turn-back portion, and a conduit portion leading from the turn-back portion to a terminal end. A space equal to or greater than the outer diameter of the conduit portions may be provided between these conduit portions. The heat exchanger tubes may be arranged in parallel by overlapping the flattened portions.

In the heat exchange unit, the heat exchanger tubes may be each arranged with the space into which the conduit portions of another heat exchanger tube partially come. A gap between the adjacent conduit portions of the heat exchanger tubes may be set to be less than the diameter of the conduit portions.

In the heat exchange unit, the one or more heat exchanger tubes may be coupled to the chambers to set a temperature gradient in the fluid to be heated flowing through the chambers.

According to an aspect of the heat exchange apparatus, the heat exchange apparatus includes a combustion housing causing an exhaust gas to flow, and a heat exchange unit disposed in the combustion housing. The heat exchange unit includes a heat exchanger tube part including one or more heat exchanger tubes allowing a fluid to be heated to flow through the one or more heat exchanger tubes, and a header part including a plurality of chambers coupled by the heat exchanger tube part, the chambers forming a flow passage of the fluid to be heated through the heat exchanger tube part.

In the heat exchange apparatus, the heat exchanger tube part may include a plurality of the heat exchanger tubes. The heat exchanger tubes may each include a turn-back portion having a flattened portion flattened in a direction orthogonal to a curved surface of the turn-back portion, a conduit portion leading from a starting end to the turn-back portion, and a conduit portion leading from the turn-back portion to a terminal end. A space equal to or greater than the outer diameter of the conduit portions may be provided between these conduit portions. The exhaust gas may be caused to flow in a direction crossing the fluid to be heated flowing through the heat exchanger tubes to transfer heat of the exhaust gas to the fluid to be heated.

The heat exchange apparatus may include a burner disposed above or below the heat exchange unit. The exhaust gas may be contacted with the one or more heat exchanger tubes in a direction crossing a flowing direction of the fluid to be heated.

According to an aspect of the hot water supply system, the hot water supply system includes a burner combusting a fuel gas, a combustion housing causing an exhaust gas by the burner to flow, and a heat exchange unit disposed in the combustion housing. The heat exchange unit includes a heat exchanger tube part including one or more heat exchanger tubes allowing a fluid to be heated to flow through the one or more heat exchanger tubes, and a header part including a plurality of chambers coupled by the heat exchanger tube part, the chambers forming a flow passage of the fluid to be heated through the heat exchanger tube part.

The hot water supply system may further include a primary heat exchange unit disposed on the upstream side of a flow of the exhaust gas, and a conduit allowing the fluid to be heated flowing through the heat exchange unit to flow to the primary heat exchange unit. The heat exchange unit may transfer to the fluid to be heated a latent heat of the exhaust gas after the heat exchange in the primary heat exchange unit.

The hot water supply system may further include an air supply fan supplying air to the burner. The air supply by the air supply fan may cause an exhaust gas generated by the burner to flow through the heat exchange unit.

In the hot water supply system, the combustion housing may be provided with a drain receiver receiving a drain generated on the heat exchange unit.

According to an aspect of the method of manufacturing a heat exchanger tube, the method of manufacturing a heat exchanger tube transferring a heat of an exhaust gas to a fluid to be heated includes forming a turn-back portion at an intermediate portion of a tube, forming a reciprocating conduit portion including a conduit portion leading from a starting end of the tube to the turn-back portion and a conduit portion leading from the turn-back portion to a terminal end of the tube, a space between these conduit portions having a size exceeding the outer diameter of the tube, and forming in the turn-back portion a flattened portion that is a conduit flattened in a direction orthogonal to a curved surface of the turn-back portion.

According to the heat exchanger tube, the heat exchange unit, the heat exchange apparatus, the hot water supply system, or the method of manufacturing a heat exchanger tube, the following effects can be obtained.

(1) According to the heat exchanger tube, the heat exchanger tubes can be arranged with each other in an overlapping state such that the conduit portion of another heat exchanger tube partially comes into the space between the conduit portions of the heat exchanger tube, and since the space is narrowed between the heat exchanger tubes, the degree of contact with the exhaust gas can be increased, and the heat exchanger tube can be reduced in size.

(2) According to the heat exchanger tube, the heat exchanger tubes can be densified, and the exhaust gas can be entwined with the heat exchanger tubes to improve the heat exchange efficiency.

(3) According to the heat exchange unit, the multiple chambers included in the header part are coupled by the heat exchanger tube part to constitute a flow passage of the fluid to be heated together with the heat exchanger tubes of the heat exchanger tube part, so that the heat exchange efficiency of the exhaust gas to the fluid to be heated can be enhanced.

(4) According to the heat exchange apparatus, since the header part together with the heat exchanger tube part are disposed in the combustion housing and brought into contact with the exhaust gas, the heat exchange efficiency of the exhaust gas is enhanced.

(5) According to the hot water supply system, the heat exchange efficiency of the exhaust gas can be improved to enhance the hot water supply characteristics.

(6) According to the method of manufacturing a heat exchanger tube, the densification can be achieved so that the heat exchanger tube part can be reduced in size while the heat exchanger tube with high heat exchange efficiency can be provided.

As described above, the most preferable embodiments etc. of the present disclosure have been described. The present invention is not limited to the above description. Various modifications and changes can be made by those skilled in the art based on the spirit of the invention described in claims or disclosed in detailed description of the invention. Such variations and modifications obviously fall within the scope of the present invention.

The present disclosure provides an increase in the degree of contact between the exhaust gas and the heat exchanger tube, an enhancement of the heat exchange efficiency, an increase in the density of the heat exchanger tubes for making the heat exchange unit compact and achieving reductions in sizes of the heat exchange apparatus and the hot water supply system, etc. and is therefore useful.

The invention claimed is:

1. A heat exchange unit for transferring heat of an exhaust gas to a fluid to be heated, the heat exchange unit comprising:

heat exchanger tubes allowing the fluid to be heated to flow through the heat exchanger tubes, each heat exchanger tube including a turn-back portion and a reciprocating conduit portion, the reciprocating conduit portion including a first conduit portion leading from a starting end to the turn-back portion and a second conduit portion leading from the turn-back portion to a terminal end, the heat exchanger tubes including first heat exchanger tubes, second heat exchanger tubes, third heat exchanger tubes, and fourth heat exchanger tubes, the first heat exchanger tubes and the second heat exchanger tubes being arranged relative to each other in a direction along a parallel plane that comes in contact with the turn-back portion and the reciprocating conduit portion of one of the heat exchanger tubes, the second heat exchanger tubes and the third heat exchanger tubes being arranged relative to each other in a perpendicular direction to the parallel plane, and the third heat exchanger tubes and the fourth heat exchanger tubes being arranged relative to each other in the direction along the parallel plane; and a header part including a first chamber, a second chamber, and a third chamber, the first chamber being coupled to the second conduit portions of the first heat exchanger tubes and the first conduit portions of the second heat exchanger tubes, the second chamber being coupled to the second conduit portions of the second heat exchanger tubes and the first conduit portions of the third heat exchanger tubes, and the third chamber being coupled to the second conduit portions of the third heat exchanger tubes and the first conduit portions of the fourth heat exchanger tubes, the first chamber forming a first flow passage of the fluid to be heated to flow in a first direction along the parallel plane, the second chamber forming a second flow passage of the fluid to be heated to flow in the perpendicular direction to the parallel plane, and the third chamber forming a third flow passage of the fluid to be heated to flow in a second direction opposite to the first direction.

2. The heat exchange unit according to claim 1, wherein the turn-back portion has a flattened portion flattened in a direction orthogonal to a curved surface of the turn-back portion, wherein a space equal to or greater than the outer diameter of the first and second conduit portions is provided between the first and second conduit portions, and wherein at least one of the first second, third, or fourth heat exchanger tubes are arranged in parallel by overlapping the flattened portions.

3. The heat exchange unit according to claim 2, wherein each heat exchanger tube is arranged with the space into which a part of the first or second conduit portion of another heat exchanger tube comes, and wherein a gap between the first or second conduit portion of the each heat exchanger tube and the part of the first or second conduit portion of the another heat exchanger tube is set to be less than the diameter of the first and second conduit portions.

4. The heat exchange unit according to claim 1, wherein a temperature gradient is set in the fluid to be heated flowing through the chambers.

5. The heat exchange unit according to claim 1, wherein
the header part further includes another chamber adjacent to the at least one of the first, second, and third chambers, and
a gap is formed in a partition member between the at least one of the first, second, and third chambers and the another chamber, and the gap of the partition member forms a bypass path.

6. A heat exchange apparatus comprising:
a combustion housing causing an exhaust gas to flow; and
a heat exchange unit disposed in the combustion housing, wherein
the heat exchange unit includes
heat exchanger tubes allowing a fluid to be heated to flow through the heat exchanger tubes, each heat exchanger tube including a turn-back portion and a reciprocating conduit portion, the reciprocating conduit portion including a first conduit portion leading from a starting end to the turn-back portion and a second conduit portion leading from the turn-back portion to a terminal end, the heat exchanger tubes including first heat exchanger tubes, second heat exchanger tubes, third heat exchanger tubes, and fourth heat exchanger tubes, the first heat exchanger tubes and the second heat exchanger tubes being arranged relative to each other in a direction along a parallel plane that comes in contact with the turn-back portion and the reciprocating conduit portion of one of the heat exchanger tubes, the second heat exchanger tubes and the third heat exchanger tubes being arranged relative to each other in a perpendicular direction to the parallel plane, and the third heat exchanger tubes and the fourth heat exchanger tubes being arranged relative to each other in the direction along the parallel plane; and
a header part including a first chamber, a second chamber, and a third chamber, the first chamber being coupled to the second conduit portions of the first heat exchanger tubes and the first conduit portions of the second heat exchanger tubes, the second chamber being coupled to the second conduit portions of the second heat exchanger tubes and the first conduit portions of the third heat exchanger tubes, and the third chamber being coupled to the second conduit portions of the third heat exchanger tubes and the first conduit portions of the fourth heat exchanger tubes, the first chamber forming a first flow passage of the fluid to be heated to flow in a first direction along the parallel plane, the second chamber forming a second flow passage of the fluid to be heated to flow in the perpendicular direction to the parallel plane, and the third chamber forming a third flow passage of the fluid to be heated to flow in a second direction opposite to the first direction.

7. The heat exchange apparatus according to claim 6, wherein the turn-back portion has a flattened portion flattened in a direction orthogonal to a curved surface of the turn-back portion,
wherein a space equal to or greater than the outer diameter of the first and second conduit portions is provided between the first and second conduit portions, and
wherein the exhaust gas is caused to flow along the parallel plane and in a direction crossing the fluid to be heated flowing through the heat exchanger tubes to transfer heat of the exhaust gas to the fluid to be heated.

8. The heat exchange apparatus according to claim 6, further comprising a burner disposed above or below the heat exchange unit,
wherein the exhaust gas is contacted with the heat exchanger tubes in a direction crossing a flowing direction of the fluid to be heated.

9. The heat exchange apparatus according to claim 6, wherein
the header part further includes another chamber adjacent to the at least one of the first, second, and third chambers, and
a gap is formed in a partition member between the at least one of the first, second, and third chambers and the another chamber, and the gap of the partition member forms a bypass path.

10. A hot water supply system comprising:
a burner combusting a fuel gas;
a combustion housing causing an exhaust gas by the burner to flow; and
a heat exchange unit disposed in the combustion housing, wherein
the heat exchange unit includes
heat exchanger tubes allowing a fluid to be heated to flow through the heat exchanger tubes, each heat exchanger tube including a turn-back portion and a reciprocating conduit portion, the reciprocating conduit portion including a first conduit portion leading from a starting end to the turn-back portion and a second conduit portion leading from the turn-back portion to a terminal end, the heat exchanger tubes including first heat exchanger tubes, second heat exchanger tubes, third heat exchanger tubes, and fourth heat exchanger tubes, the first heat exchanger tubes and the second heat exchanger tubes being arranged relative to each other in a direction along a parallel plane that comes in contact with the turn-back portion and the reciprocating conduit portion of one of the heat exchanger tubes, the second heat exchanger tubes and the third heat exchanger tubes being arranged relative to each other in a perpendicular direction to the parallel plane, and the third heat exchanger tubes and the fourth heat exchanger tubes being arranged relative to each other in the direction along the parallel plane; and
a header part including a first chamber, a second chamber, and a third chamber, the first chamber being coupled to the second conduit portions of the first heat exchanger tubes and the first conduit portions of the second heat exchanger tubes, the second chamber being coupled to the second conduit portions of the second heat exchanger tubes and the first conduit portions of the third heat exchanger tubes, and the third chamber being coupled to the second conduit portions of the third heat exchanger tubes and the first conduit portions of the fourth heat exchanger tubes, the first chamber forming a first flow passage of the fluid to be heated to flow in a first direction along the parallel plane, the second chamber forming a second flow passage of the fluid to be heated to flow in the perpendicular direction to the parallel plane, and the third chamber forming a third flow passage of the fluid to be heated to flow in a second direction opposite to the first direction.

11. The hot water supply system according to claim 10, further comprising:
a primary heat exchange unit disposed on the upstream side of a flow of the exhaust gas, and
a conduit allowing the fluid to be heated flowing through the heat exchange unit to flow to the primary heat exchange unit, wherein
the heat exchange unit transfers to the fluid to be heated a latent heat of the exhaust gas after the heat exchange in the primary heat exchange unit.

12. The hot water supply system according to claim 10, further comprising an air supply fan supplying air to the burner,
wherein the air supply by the air supply fan causes an exhaust gas generated by the burner to flow through the heat exchange unit.

13. The hot water supply system according to claim 10, wherein the combustion housing is provided with a drain receiver receiving a drain generated on the heat exchange unit.

14. The hot water supply system according to claim 10, wherein
the header part further includes another chamber adjacent to the at least one of the first, second, and third chambers, and
a gap is formed in a partition member between the at least one of the first, second, and third chambers and the another chamber, and the gap of the partition member forms a bypass path.

\* \* \* \* \*